(12) United States Patent  
Foster et al.

(10) Patent No.: US 7,955,477 B2  
(45) Date of Patent: Jun. 7, 2011

(54) SYSTEMS AND METHODS FOR SOLAR DISTILLATION

(75) Inventors: Robert E. Foster, Mesilla Park, NM (US); Michael J. Cormier, Chaparral, NM (US); Gregory R. Vogel, Las Cruces, NM (US); William H. Amos, Chaparral, NM (US)

(73) Assignee: SolAqua, Inc., El Paso, TX (US)

( * ) Notice: Subject to any disclaimer, the term of this patent is extended or adjusted under 35 U.S.C. 154(b) by 803 days.

(21) Appl. No.: 11/881,592

(22) Filed: Jul. 27, 2007

(65) Prior Publication Data

US 2008/0067054 A1   Mar. 20, 2008

Related U.S. Application Data

(63) Continuation of application No. 10/701,623, filed on Nov. 6, 2003, now Pat. No. 7,264,695, which is a continuation-in-part of application No. 10/125,438, filed on Apr. 19, 2002, now Pat. No. 7,153,395, which is a continuation-in-part of application No. 09/845,359, filed on May 1, 2001, now Pat. No. 6,767,433.

(51) Int. Cl.  
*B01D 3/00* (2006.01)

(52) U.S. Cl. ......... 202/234; 202/267.1; 203/10; 203/86; 159/22; 159/32

(58) Field of Classification Search ............... 202/234, 202/189, 267.1; 203/10, 86; 159/903, DIG. 15, 159/22, 32

See application file for complete search history.

(56) References Cited

U.S. PATENT DOCUMENTS

| 3,655,517 A | 4/1972 | Hensley et al. ............... 202/234 |
| 3,930,958 A | 1/1976 | Maruichi ....................... 202/174 |
| 4,010,080 A | 3/1977 | Tsay et al. ....................... 202/83 |

(Continued)

FOREIGN PATENT DOCUMENTS

DE   2604978   3/1977

(Continued)

OTHER PUBLICATIONS

Robert Foster and Mike Cormier, "Solar Still Construction and Operation," El Paso Solar Energy Association (El Paso, Texas), (Summer 1999).

(Continued)

*Primary Examiner* — Nina Bhat  
(74) *Attorney, Agent, or Firm* — Wolff Law Offices, PLLC; Kevin A. Wolff

(57) ABSTRACT

The present invention is directed to distillation systems and methods. The still may have an impermeable nonporous membrane that may be extruded, molded, vacuum formed or sprayed-on. The membrane may be installed in a lightweight basin as a liner. The distillation system may also include a unique sealing system that may include a gasket with a cross-section shaped like the lowercase letter "e" and may include a trim piece that hold a basin casing and casing cover together. The distillation system may be designed in such a manner so as to make shipping and assembly easy and cost effective. For example, the distillation system may be constructed as a kit that all needed components and all the components are placed inside of a standard dimension box for shipping. In various embodiments, the distillation system may be a solar distillation system.

20 Claims, 22 Drawing Sheets

U.S. PATENT DOCUMENTS

| | | | | |
|---|---|---|---|---|
| 4,055,473 A | 10/1977 | Hay | ............................... | 202/234 |
| 4,077,849 A | 3/1978 | Ziehm, Jr. | ..................... | 202/205 |
| 4,135,985 A | 1/1979 | LaRocca | ........................ | 202/176 |
| 4,137,901 A | 2/1979 | Maier | ........................... | 126/271 |
| 4,138,293 A | 2/1979 | Ziehm, Jr. | ..................... | 202/180 |
| 4,141,798 A | 2/1979 | Grosse | .......................... | 202/234 |
| 4,172,767 A | 10/1979 | Sear | ............................. | 202/182 |
| 4,227,970 A | 10/1980 | Howell, Jr. et al. | ........... | 202/234 |
| 4,235,679 A | 11/1980 | Swaidan | ....................... | 202/234 |
| 4,267,021 A | 5/1981 | Speros et al. | ................. | 202/176 |
| 4,279,244 A | 7/1981 | McAlister | ..................... | 126/621 |
| 4,329,205 A | 5/1982 | Tsumura et al. | .............. | 202/174 |
| 4,420,375 A | 12/1983 | Husson | .......................... | 202/234 |
| 4,440,861 A | 4/1984 | McCarthy | ..................... | 435/306 |
| 4,487,659 A | 12/1984 | Stark | ............................ | 202/172 |
| 4,527,543 A | 7/1985 | Denton | ........................ | 122/19.2 |
| 4,606,794 A | 8/1986 | Wyckoff | ........................ | 202/173 |
| 4,620,900 A | 11/1986 | Kimura et al. | ................ | 202/172 |
| 4,756,802 A | 7/1988 | Finney | .......................... | 202/172 |
| 4,853,088 A | 8/1989 | Conway | ......................... | 203/10 |
| 4,966,655 A | 10/1990 | Wilkerson, Jr. | .............. | 202/234 |
| 5,098,220 A | 3/1992 | Norman | ......................... | 405/52 |
| 5,316,626 A | 5/1994 | Guy | ................................ | 203/10 |
| 5,338,383 A | 8/1994 | Polackowyj | ..................... | 156/80 |
| 5,391,262 A | 2/1995 | Wilkerson, Jr. | .................. | 203/10 |
| 5,468,351 A | 11/1995 | Hirota et al. | .................. | 202/234 |
| 5,598,661 A | 2/1997 | Eiderman et al. | ............. | 47/48.5 |
| 5,628,879 A | 5/1997 | Woodruff | ....................... | 202/234 |
| 5,650,050 A | 7/1997 | Kaufmann | ................... | 202/234 |
| 5,969,087 A | 10/1999 | Maeda | .......................... | 528/353 |
| 6,001,222 A | 12/1999 | Klein | ............................ | 202/234 |
| 6,063,995 A | 5/2000 | Bohland et al. | ............... | 136/243 |
| 6,440,275 B1 | 8/2002 | Domen | ........................ | 202/234 |
| 6,767,433 B2 | 7/2004 | Foster et al. | ................. | 202/234 |
| 6,797,124 B2 | 9/2004 | Ludwig | .......................... | 202/234 |
| 7,491,298 B2 * | 2/2009 | Zlotopolski | ..................... | 203/10 |

FOREIGN PATENT DOCUMENTS

| | | |
|---|---|---|
| DE | 3339898 | 11/1983 |
| WO | WO 9816474 A | 4/1998 |

OTHER PUBLICATIONS

European Search Report.
The Solar Water Purifier, Advertisement for Global Pure Water Pty. Ltd., www.globalpurewater.com.au, Nov. 25, 2001.

* cited by examiner

SYSTEMS AND METHODS FOR SOLAR DISTILLATION

CROSS REFERENCE TO RELATED APPLICATIONS

This application is a continuation of prior U.S. patent application Ser. No. 10/701,623 filed on Nov. 6, 2003 now U.S. Pat. No. 7,264,695, which is a continuation-in-part of prior U.S. patent application Ser. No. 10/125,438 filed on Apr. 19, 2002 (now U.S. Pat. No. 7,153,395), which is a continuation-in-part of prior U.S. patent application Ser. No. 09/845,359 filed on May 1, 2001 (now U.S. Pat. No. 6,767,433), which are hereby incorporated herein by reference for all purposes.

TECHNICAL FIELD

The invention relates generally to solar energy methods and systems, and particularly with systems and methods for solar energy distillation.

BACKGROUND OF THE INVENTION

Solar energy is a free renewable energy source that is readily available in many parts of the world. Given that solar energy is readily available to all for merely the cost of equipment to convert it to an intended purpose, solar energy may be particularly attractive for use in areas with populations that have limited financial resources. Technological developments have resulted in the use of solar energy for many applications, for example, thermal heating systems, electricity production systems, and solar distillation systems.

Solar distillation systems (also referred to herein as "solar distillers," "solar stills," "single basin or multiple effect stills," or simply "stills") have been in use since 1872. Some examples may be found with reference to various patents including: U.S. Pat. Nos. 5,628,879; 4,135,985; 4,141,798; 4,487,659; and 4,267,021. Unfortunately, many of these prior art still designs suffer from various deficiencies so that they do not provide a practical solution for providing clean and safe drinking water to the masses of people throughout the world who have limited knowledge about solar energy distillation systems and finances. For example, many of the known stills are difficult and/or expensive to construct or purchase. In fact, in some areas of the world proper and safe building materials for building stills are not available. Some stills are often difficult to construct, difficult to move, not durable, and/or difficult to maintain.

One particular application of solar distillation systems is water distillation. In many geographical locations of the world clean and safe potable drinking water is expensive and/or in scarce supply. Often the available water supply is salty, brackish, and/or contaminated with various undesirable and possibly toxic substances which results in water that may not be suitable for human and/or animal consumption. These geographical locations are often remote and might not have common utilities such as electricity and/or effective public water purification systems. Further, the people who inhabit these locations may not have enough money to be able to afford public water or continuous electric utility cost. As a result they often resort to purchasing bottle water for drinking and cooking purposes. However, a properly designed and operated solar still as provided by the present invention may be a preferred alternative to purchasing bottled water by providing many years of clean safe good tasting water production to these people. Such a solar still may be extremely effective in providing clean drinking water from a high dissolved salt and other mineral content water, effective at eliminating dangerous bacteria such as cholera, *E. coli*, etc, cost effective, easy to install, and easy to maintain. Although many solar still designs are not always capable of effectively removing volatile organic compounds (VOC) such as pesticides, or petroleum distillates.

In one type of solar still the still basin may be sealed with a variety of materials, including silicone, so as to retain the liquid solution to be distilled. The basin sealing materials are applied to a rigid basin structural material or insulation material as a coating of material in liquid form that dries and adheres to a rigid basin structural material so as to seal the basin for retaining, for example, water. For example, the solar still basin structural material may be a cement, concrete or wood material and one or more layers of silicone may be manually spread over the surface of the basin or an insulation lined basin to seal the basin structural material from the liquid (e.g., water) to be distilled. This sealing layer(s) may be referred to as the "membrane" or "diaphragm" of the still. However, manual application of the silicone is a cumbersome process and it is difficult to ensure an adequate seal in all locations of the basin due to the inaccuracy of the manual spreading process. Fumes from the silicone application can be toxic and cause people to become faint or nauseated. Further, some types of silicone used may break down and contaminate the water, resulting in contaminated distillate.

SUMMARY OF THE INVENTION

The present invention is directed to improved solar powered distillation systems and methods that can be provided, cost effectively, to the masses of people worldwide. The improved solar powered distillation systems may be made of lightweight, cost effective, and durable materials (e.g., aluminum, plastics, rubber, etc.) and construction to ensure a low cost still that is easily transportable (moveable), affordable and durable so as to provide years of safe clean water production for people at any location throughout the world. The solar powered still may have a waterproof membrane that is extruded, molded, vacuum formed, and/or spray-on and installed in a lightweight basin as a liner for improved ease of still manufacturing and assembly as well as improved sealing. The membrane may be a nonporous or substantially nonporous membrane that may be impermeable to a liquid to be distilled and vapors that result from the liquid to be distilled. The membrane may be formed so as to create a single water retention area or a plurality of water retention areas in a single basin. The plurality of water retention areas may be constructed in a stair stepped construction. The basin and/or membrane may include a distillate output trough. In a variation, the basin and/or membrane may include an input liquid overflow trough so as to keep the input liquid from entering into the distillate output trough when excessive input liquid is introduced to the still. Further, the membrane may include silicone. In a preferred embodiment, the membrane material may be an opaque food grade non-toxic odorless, low out gassing, weather resistant, tasteless silicone that may be platinum cured. For example, the membrane material may include Dow Corning 40/Silicone FDA Ingredients per CFR 177.2600 or Dow Corning 999-A that may be comprised of hydroxy-terminated dimethyl siloxane and amorphous silica, and may further contain methyltriacetoxysilane, ethyltriacetoxysaline, polydimethylsiloxane, and/or carbon black. In another embodiment, the membrane and/or casing materials may be an opaque water grade non-toxic odorless material having a rating meeting American National Standards Institute (ANSI)/National Sanitation Foundation (NSF) Standard 61 for drinking water components. For example, this may include Thermoplastic Vulcanizates (TPV) and their subtypes: Thermoplastic Elastomers (TPE), Thermoplastic Rubbers (TPR), Thermoplastic olefins (TPO) and Ethylene Propylene Terpolymer Rubbers (EPDM). Further, a polyether polyurethane material may be used. TPV materials include those under the name Sarlink; TPE materials include those under the name Uniprene comprised of, for example, an ethylene propylene diene monopolymer that may be block vulcanized with homopolymer propylene; TPR materials include those under the name Santoprene. Also meeting ANSI/NSF Standard 61 are low out gassing, weather resistant silicones such as Dow Corning 732 Multipurpose Sealant Black or other color that may be comprised of hydroxy-terminated dimethyl siloxane and amorphous silica, and may further contain methyltriacetoxysilane, ethyltriacetoxysaline, polydimethylsiloxane, and/or carbon black. Likewise Fiberglass Reinforced Polyester (FRP) such as Bedford Reinforced Plastics Sheet FRP.

The solar still basin casing may be made of a material with sufficient structural strength, rigidity and durability such as an aluminum, plastic or fiberglass. In one variation, the solar still basin may be formed from an aluminum sided insulation material, for example, Thermax made by Celotex. In another variation, the still basin casing and/or interior membranes may be made of a molded acrylonitrile butadiene styrene (ABS) plastic polycarbonate, polyprolylene, or polybutylene. In a further variation, the basin casing may be made of a vacuum formed fiberglass using, for example, a process such as closed cavity bag molding (CCBM). The plastic still basin casing may include one or more strengthening members molded into the formed plastic. Further, a secondary trough may be formed in the still basin for preventing input fluids yet to be distilled from mixing with or contaminating the distilled liquid in an output trough. In a further variation the solar still may also include a carbon filter attached to either the input or output of the solar still for filtering out VOCs.

In an even further variation the solar still may include legs such as fixed legs, or adjustable legs. Adjustable legs may facilitate leveling the still to ensure the most efficient operation possible. A leg-to-basin support coupling or leg retention socket may be affixed to the solar still casing into which the legs may be placed to improve support of the solar still. The leg support system may include a combination of three four horizontal connection members to couple four vertical legs of the system together without crumbling under the weight of a fully filled and operational solar still. Further, the solar still may include a sealing member which helps form a better or hermetic seal between the basin and a transparent covering that is used to permit light to enter the solar still. The sealing member may be a custom preformed elongated e-shaped silicone seal that may be attached to a sill on the basin so as to help seal the basin to a transparent material covering placed over the top of the basin. The solar still may also include an output trough associated with overflow outlet port. In one preferred application, the solar still may be used as a solar water purification system and method. The still may be provided to users in kit form and assembled on location where it is to be used. In any case, the still is a portable cost effective system that may be used to provide distilled water in any location throughout the world.

BRIEF DESCRIPTION OF THE DRAWINGS

The objects, features and advantages of the present invention will become more readily apparent to those skilled in the art upon reading the following detailed description, in conjunction with the appended drawings, in which.

DESCRIPTION OF THE PREFERRED EMBODIMENTS

Although solar powered distillation systems have been know for some time, a low cost, lightweight, easy to assemble, portable still with good reliability has not been available until the creation of the present invention. As such, until now low cost high volume production of solar power distillation systems has not been viable. The present invention uses a unique set of materials and assembly processes, along with offering a unique method of still operation, to provide a low cost, lightweight, easy to assemble, durable and reliable solar power distillation system that may be sold, shipped to, and used at any location (including remote locations) throughout the world. A preferred application for the solar distillation system of the present invention is water distillation for providing clean safe drinking water. However, the present invention may also be used for other distillations and even for heating liquids (e.g., producing hot water).

Figure 1:
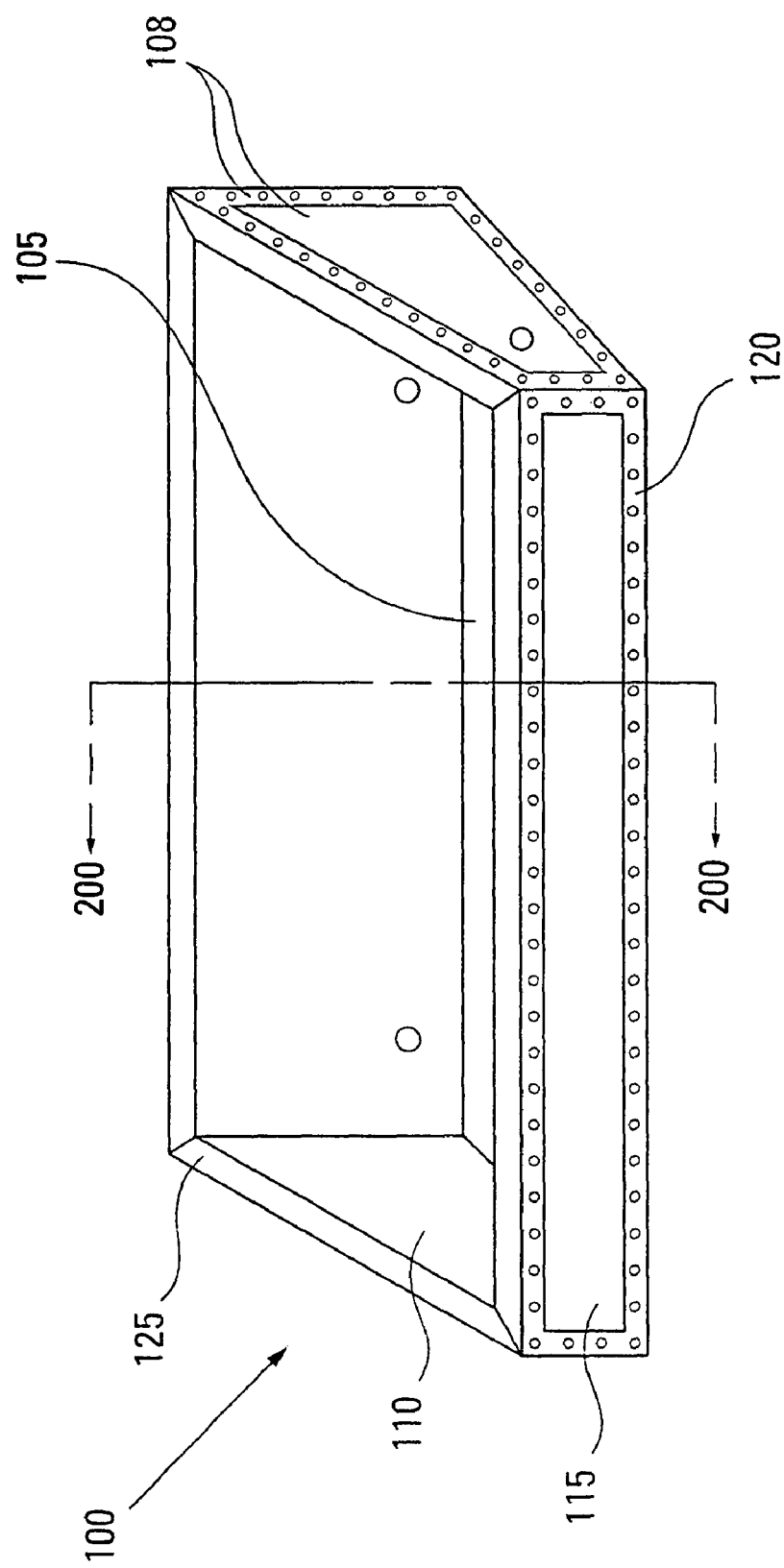
FIG. 1 is a perspective view of an exemplary solar powered distillation system, according to the present invention.

Referring now to FIG. 1, a perspective view of one exemplary embodiment for the solar powered distillation system according to the present invention is provided. The solar powered distillation system 100 includes a basin 105 that may include a basin casing 108 and an impermeable membrane 110 lining the interior surfaces of the basin casing 108. The basin casing 108 may include a structurally rigid and durable outside surface material 115, for example aluminum lined with an insulation material. Further, the basin casing 108 exterior may be trimmed on its edges and corners with strengthening members 120, preferably made of, for example, aluminum. The exterior of the basin casing 108 is preferably made of durable materials that will hold up to harsh climate conditions including extreme heat (e.g., desert operation). The interior surface of the basin 105 serves at least two distinct purposes: retaining the liquid to be distilled and absorbing sunlight during distillation. Further, the membrane 110 should be easily assembled into the basin 105. As such, in a preferred embodiment the membrane 100 may be made of an opaque material which may be extruded as a sheet, sprayed on, vacuum formed, or molded into the form of the basin 105. The membrane 110 is preferably nonporous or substantially nonporous and impervious to both the liquid to be distilled and the resulting distillate gases that form in the system. In distilled water applications the membrane is preferably made of food grade materials so as to provide safe drinking water that tastes good. One such material may be a low off gassing, weather resistant blackened silicone that may be platinum cured, for example, Dow Corning 40/Silicone FDA ingredients per CFR 177.2600, extruded into a sheet and attached to the interior surface of the basin casing 108. Another such material may be Dow Corning 999-A. Dow Corning 999-A may be comprised of hydroxy-terminated dimethyl siloxane of greater than 60% by weight and amorphous silica of between 10%-30% by weight. In one variation, Dow Corning 999-A may further contain methyltriacetoxysilane of between 1% and 5% by weight, ethyltriacetoxysaline of between 1% and 5% by weight, polydimethylsiloxane of between 1% and 5% by weight, and/or carbon black of between 0.1% and 1% by weight. It is important that the material have a long service life and does not degrade in the presence of ultraviolet rays from the sun. The use of a dark or blackened silicone (e.g., containing carbon black) will help improve absorption of the sun's rays so as to increase the heating of the solar powered distillation system and distillation production.

The solar powered distillation system may be closed by covering the basin 100 with a piece of glass (not shown). The glass may be preferably a tempered glass and be attached to the sill 125 on the basin 105. The glass should seal the basin to produce a sealed solar powered distillation system 100 that retains as much solar heat as possible. In one preferred embodiment the glass may be attached to the basin sill 125 with a low out gassing, weather resistant, food grade silicone, for example, Dow Corning 999-A or Dow Corning 732 Multipurpose Sealant. Dow Corning 732 may be comprised of hydroxy-terminated dimethyl siloxane of greater than 60% by weight and amorphous silica of between 10%-30% by weight. In one variation, Dow Corning 732 may further contain methyltriacetoxysilane of between 1% and 5% by weight, ethyltriacetoxysaline of between 1% and 5% by weight, polydimethylsiloxane of between 1% and 5% by weight, and/or carbon black of between 0.1% and 1% by weight. In one variation, the glass may be clamped down or placed in a sliding sleeve.

Figure 2:
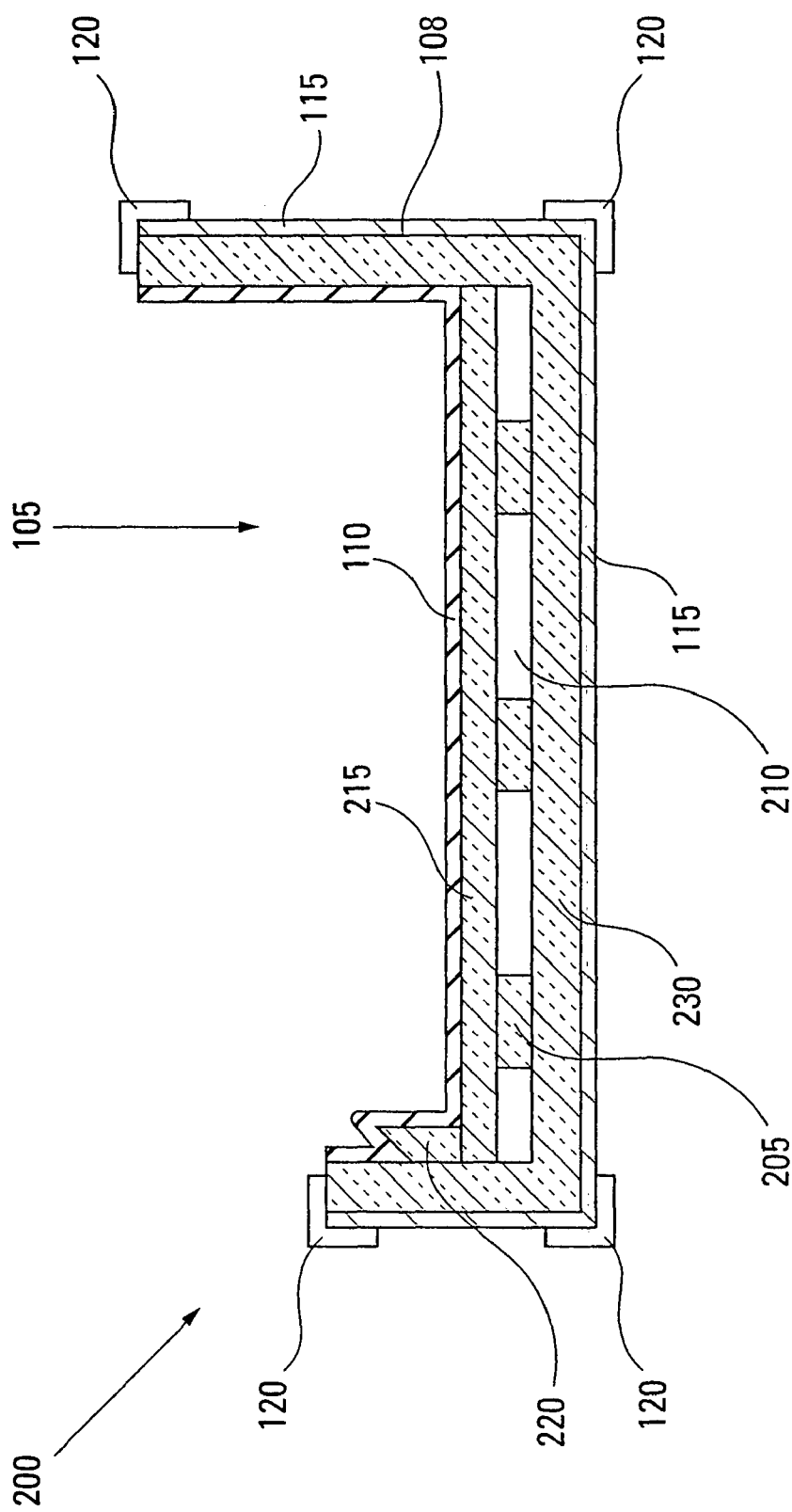
FIG. 2 is a cross section view of the exemplary solar powered distillation system shown in FIG. 1, according to one embodiment of the present invention.

Referring now to FIG. 2, a cross section view taken at line 200 of FIG. 1 is provided for one preferred embodiment. In this embodiment, the basin casing 108 is formed of a thin aluminum sheet 115 bonded to an insulation material 230 as shown. The exterior corners of the basin casing 108 are trimmed with angled structural support members 120 that are preferably made of aluminum. Additional insulation strips 205 may be attached to insulation 230 using, for example, silicone. Another layer of insulation 215 may then be attached to insulation strips 205 using, for example, silicone. As a result the bottom of the basin contains an intermediate layer of air 210 and insulation 205 which will improve the insulating characteristics of the basin 105 because most heat is radiated at the bottom of the basin 105. Another strip of insulation, the distillate collection trough 220, is attached to the short front side wall of the basin 105 and channels the distillate that condenses on the glass cover to an output port (not shown). The various insulation layers may be, for example, polyisocyanurate. In any case, membrane 110 lines the inside of the basin 105. The membrane is preferably a blackened extruded, sprayed-on, vacuum formed, or molded silicone that may be attached to the walls and floor of the inside of the basin 105 so as to retain the distillate liquid. Although not shown in the Figures, membrane 110 may also overlap the basin casing sill 125 as well as the structural support member 120 on the sill 125. A more detailed description of the basin casing 108 and membrane 110 follows.

Figure 3A:
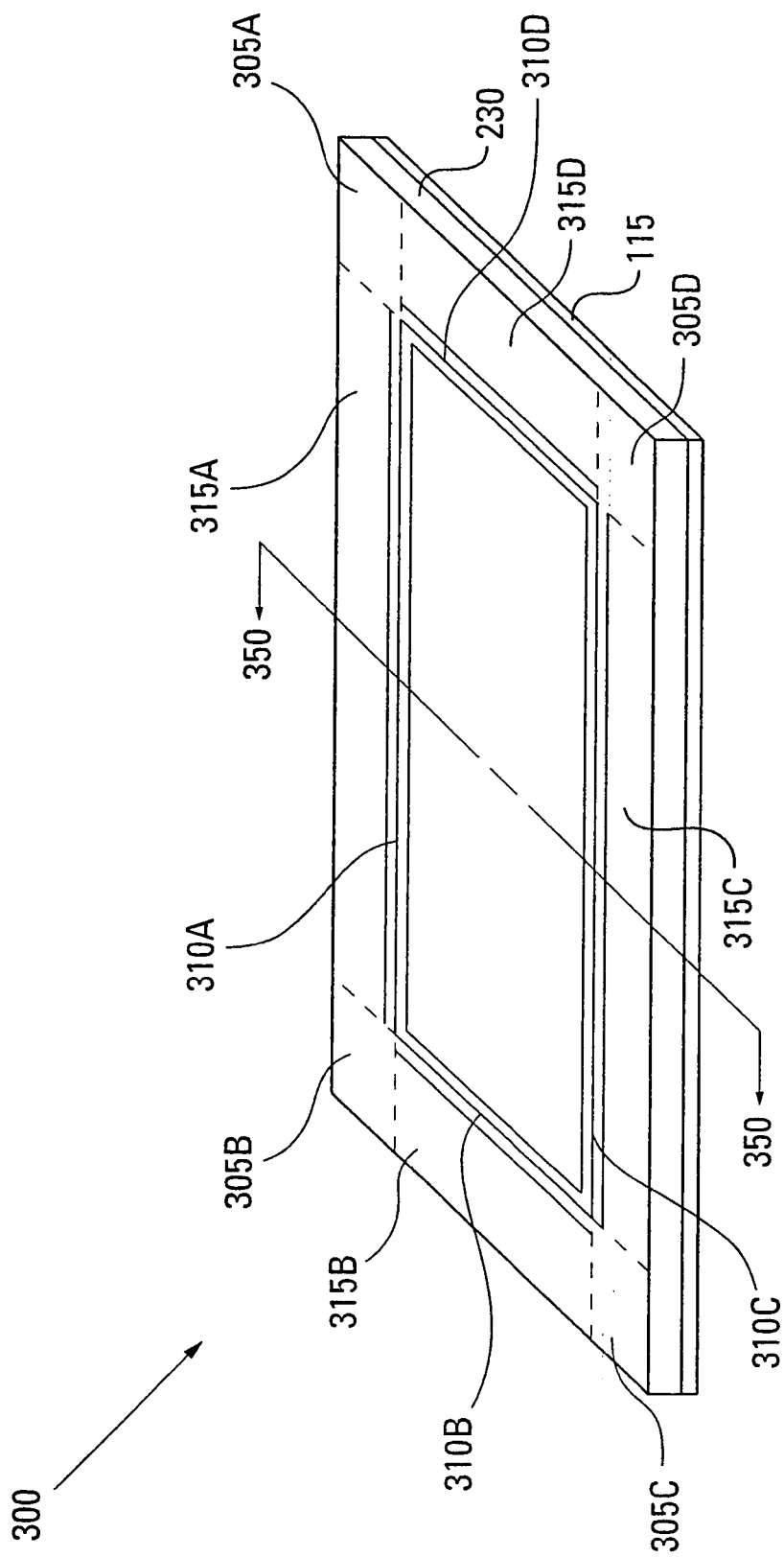
FIG. 3A is a perspective view of an aluminum sided insulation sheet as used and fabricated to form the casing of the still basin, according to one embodiment of the present invention.

FIG. 3A provides one preferred embodiment of the basin casing 108 insulation and siding. As described above, the solar powered distillation system basin casing 108 (without the structural support members 120) may be formed from an aluminum sided insulation sheet 300. A thin layer of pliable aluminum 115 may be adhered to a layer of insulation 230, for example, polyisocyanurate, Styrofoam, etc. The thin layer of aluminum will be the outer surface of the basin casing and provide structural soundness and durability against the outside environment where the still is to be operated. Although the preferred embodiment here is shown with an aluminum outer surface, the material may be any other pliable material, for example a plastic, that exhibits the structural and durability characteristics needed for the still casing. In any case, the basin casing sheet 300 is provided with grooves 310A-310D to allow for portion 315A-315D of the sheet to be folded at a 90 degree angle (perpendicular) to the main surface so as to form the sides of the basin 105. Prior to angling the sides 315A-315D relative to the main surface, the corners of the sheet 300 are eliminated. The sheet 300 may be formed with the corners notched out or the corners may be removed from the rectangular sheet 300 prior to bending the ends 315A-315D up to be perpendicular to the normal flat surface of the sheet 300.

Figure 3B:
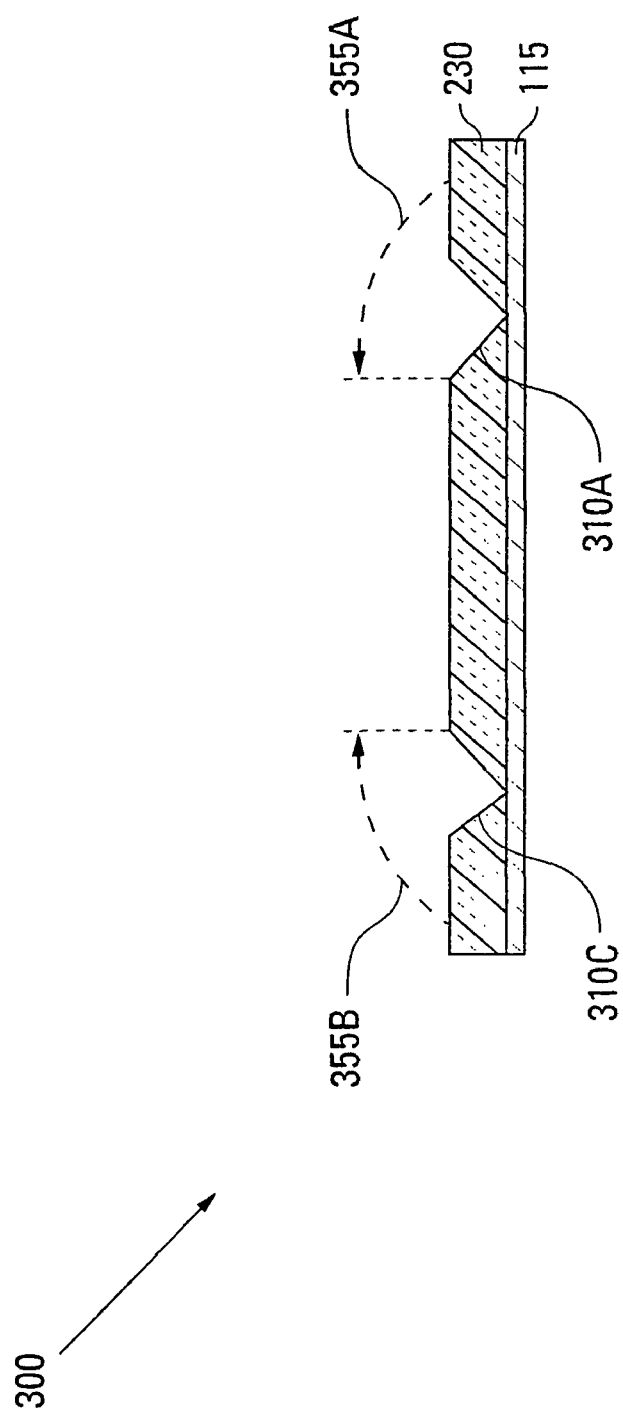
FIG. 3B is a cross section view of the aluminum sided insulation sheet as fabricated for use in forming the casing of the still basin, according to one embodiment of the present invention.

FIG. 3B provides a cross section view of sheet 300 taken across line 350 as fabricated for use in forming the casing of the still basin. As illustrated, the insulation is notched at locations 310A and 310C to enable the sides of the basin 105 to be formed at, for example, a 90 degree angle (bends 355A and 355B) from the single sheet 300. The notches are preferably a 90 degree angle notch that may be formed using a mold during formation of the insulation material 230 or by removing the insulation in these areas (310A and 310C) after a full sheet 300 is formed. In a preferred embodiment sheet 300 is a Celotex building material sheet with aluminum and polyisocyanurate and the grooves 310A-310D are formed in the sheet by, for example, cutting away portions of the polyisocyanurate. In any case, the grooves 310A-310D are formed in the sheet 300, the corners 305A-305D are notched, and the ends 315A-31 SD are bent up to form sides of the basin 105 that are perpendicular to the bottom surface (aluminum facing outward) of the basin casing 108. This approach provides a cost effective, lightweight, and durable basin casing.

Figure 4A:
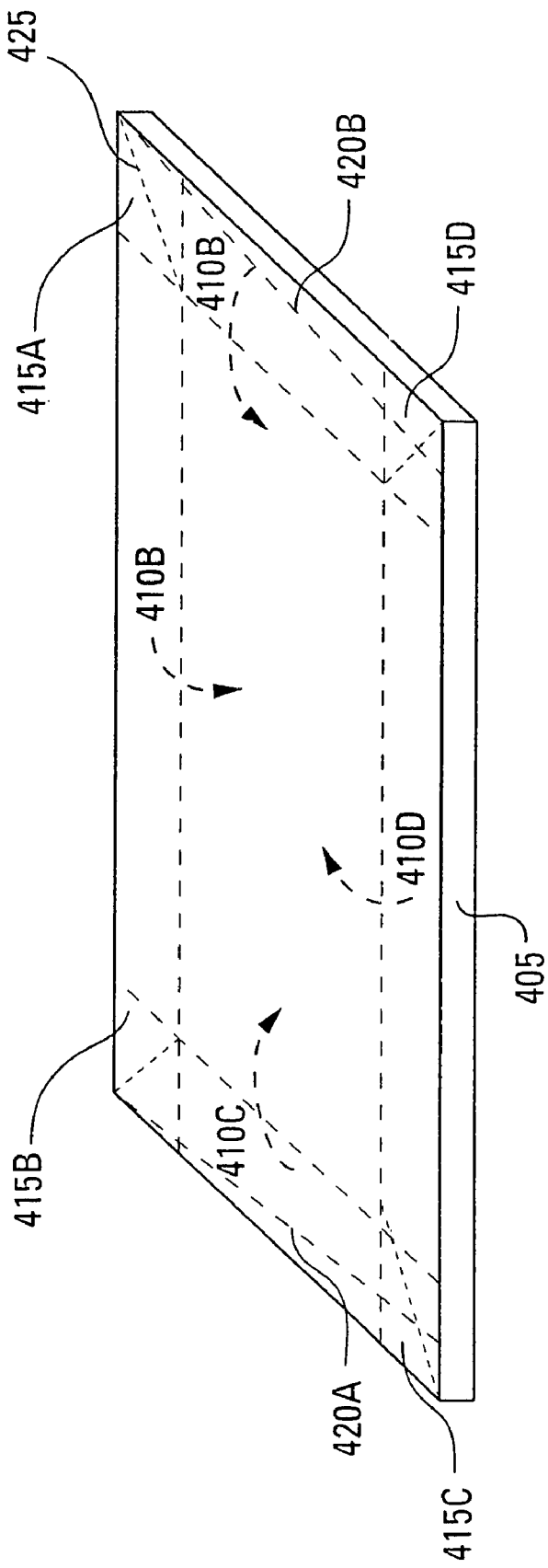
FIG. 4A is a perspective view of an extruded membrane sheet, according to one embodiment of the present invention.
Figure 4B:
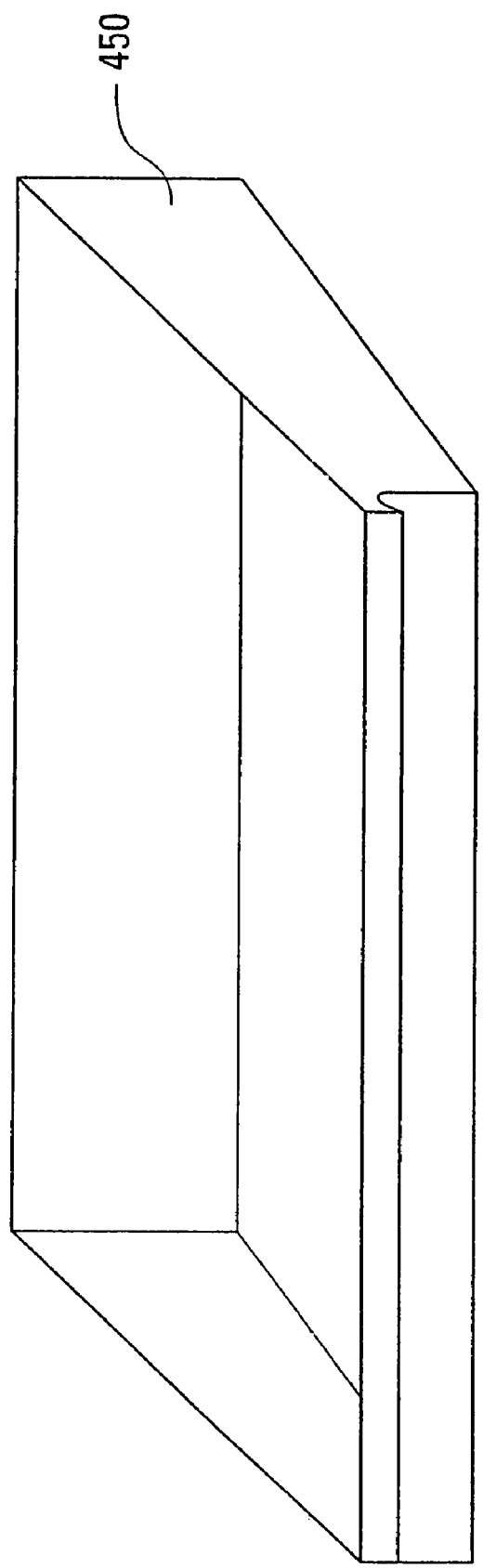
FIG. 4B is a perspective view of a molded membrane basin liner, according to one embodiment of the present invention.

As previously indicated, the membrane 110 may be formed from an extruded sheet (FIG. 4A) or be molded into a pre-formed shape (FIG. 4B). Turning to FIG. 4A, a perspective view of an extruded membrane sheet 405 used to form the basin lining membrane 110 is provided which indicates the forming processes for fitting the extruded material into a shape to line the solar distillation system basin 105. In a preferred embodiment, the extruded membrane sheet 405 is made of a food grade or water grade low out gassing, weather resistant, platinum cured, black silicone, for example Dow Corning 40 or Dow Corning 732, and extruded in a rectangular sheet large enough to completely cover the inside of the solar distillation system basin 105 when folded or cut to the shape and size of the basin 105. Although, the membrane 110 may be made of other materials that have characteristics such as being non-toxic, non-out gassing, odorless, malleable, impervious, food grade, water grade, and/or UV resistant. The four sides of the rectangular sheet 405 may be folder 90 degrees as shown by 410A-410D, to make perpendicular sides to coincide with the sides of the basin 105. As indicated by the dashed lines 420A and 420B, two ends of the extruded sheet 405 may be cut to match the slope of the two sloped side walls of the basin 105. The corners 415A-415D may be cut out at the dotted lines or simply folded over so as to form a squared corner of the membrane 110 to form fit inside the squared corner of the basin 105. The folded material of the membrane sheet 405 may be folded toward the inside or outside surface of the membrane 110 corners at, for example, the dotted lines including diagonal line 425. These corner folds may be adhesively attached to the perpendicular walls of the membrane 110 or the walls of the basin, using for example, a food grade liquid silicone such as Dow Corning 999-A. If the corners are cut out then the sides may be connected together with, for example, an adhesive so as to make a sealed membrane 110 which is form fitted to the basin 105. This adhesive may be, for example, a food grade liquid silicone such as Dow Corning 999-A that dries when exposed to air. The membrane may be made of any thickness as long as it is sufficiently durable for installation and use and malleable enough to lie close to the contour of the basin. In one preferred embodiment the membrane may be in the range of 0.010 to 0.150 inches thick for example, 0.025 inches thick. Further, in one variation the Dow Corning 40 silicone may have FDA ingredients per CFR 177.2600.

Another method of making the impervious membrane 110 is using a molding process. FIG. 4B is a perspective view of such a molded membrane basin liner according to one embodiment of the present invention. As illustrated, the molded method eliminates the need for manually shaping the membrane material to fit into the basin 100, which can save assembly time and improve the integrity of the membrane 110.

A still further method of making the impervious membrane 110 is spraying the material onto the basin 105. The membrane material to be sprayed on, for example silicone, could be in liquid form and applied with air pressure in a manner similar to spray painting. Alternatively, the material could be contained in a gas pressurized or aerosol can and may thus be easily applied on-site. This approach may be most beneficial if the solar power distillation system is shipped to location in kit form and assembled on site.

Another method of making the impervious membrane 110 may be vacuum forming the material onto a pre-formed basin 105. This approach may provide the most time efficient method of forming a basin covered with an impermeable membrane.

Figure 5:
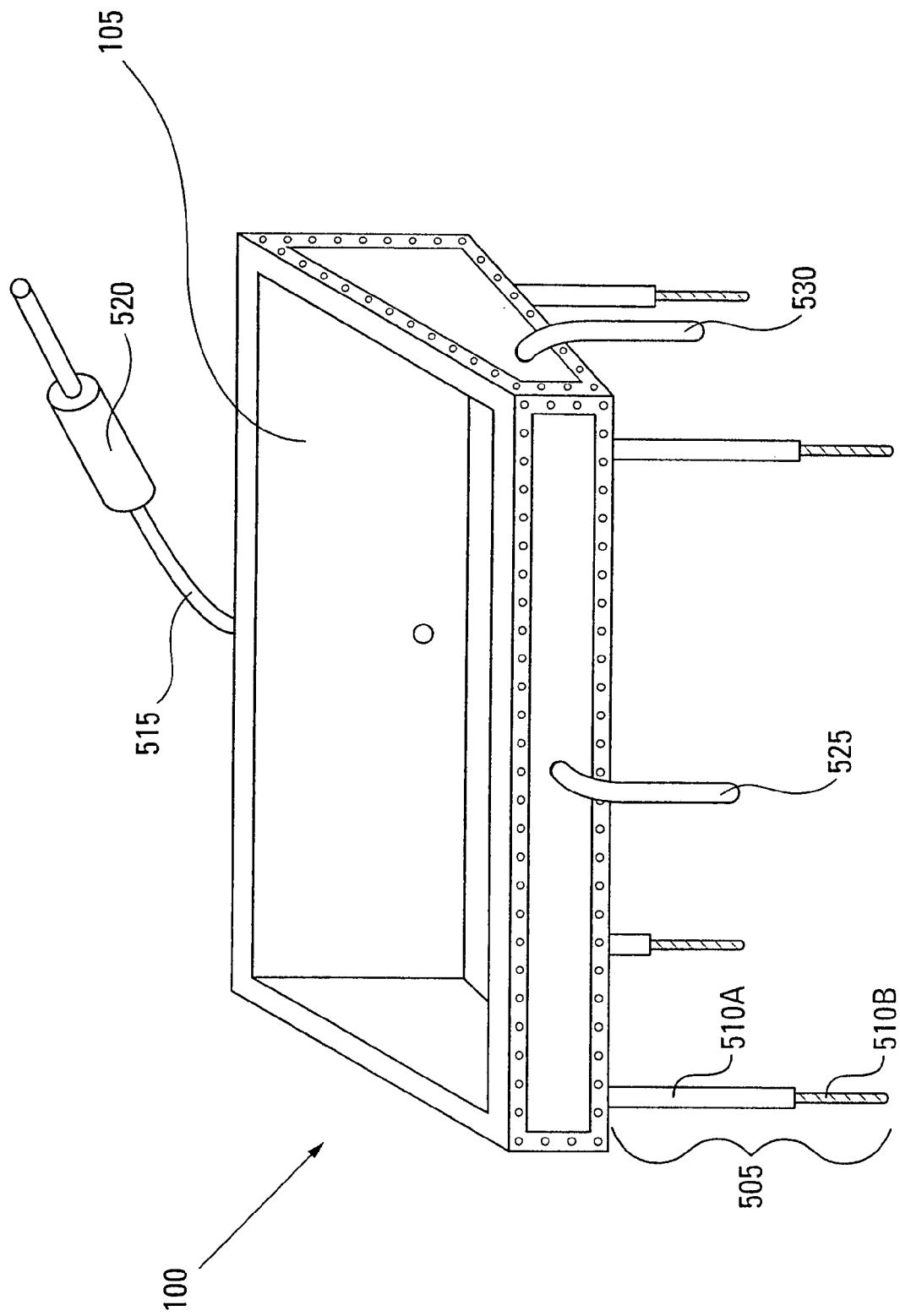
FIG. 5 is a perspective view of another exemplary solar powered distillation system, according to another embodiment of the present invention.

Referring now to FIG. 5, another exemplary solar powered distillation system 100 according to the present invention will be described. In this embodiment, the solar power distillation system includes legs, various inlet and outlet ports with tubes, and a carbon filter. First, adjustable legs 505, preferably four legs, are provided so that the basin 105 may be easily set up and leveled for maximum distillation efficiency. The adjustable legs 505 may include a first section 510A and a second section 510B which associated with one another so that the combination allows for adjustable leg length. In a preferred embodiment the second section 510B may be threaded and screw in and out of the first section 510A. Of course the sections and their respective operations could be reversed. In another embodiment, the adjustable legs may have two or more sections that slide in and out of one another and use a friction based locking mechanism to set and secure the length. The legs 505 may also be folding legs so that they may be folded parallel to the underside of the still 100 basin for convenient shipping, carrying, and storage. Alternatively the legs 505 may be affixed to the basin with a quick disconnect bracket.

The solar powered distillation system may also include an inlet port and hose 515, an overflow outlet port and hose 525, and an outlet port and hose 530. The hoses may be made of a flexible silicone based material and be food grade and/or water grade. Further, a carbon filter 520 may be provided on the inlet port 515 or the outlet port 530 so as to filter out VOCs that may not be completely removed during the distillation process. The carbon filter will remove volatile organic compounds (VOCs) such as pesticides and petroleum distillates from, for example, a source water supply or distilled water output by the system. In a preferred embodiment the carbon filter 520 is connected to the inlet port and hose 515.

Figure 6:
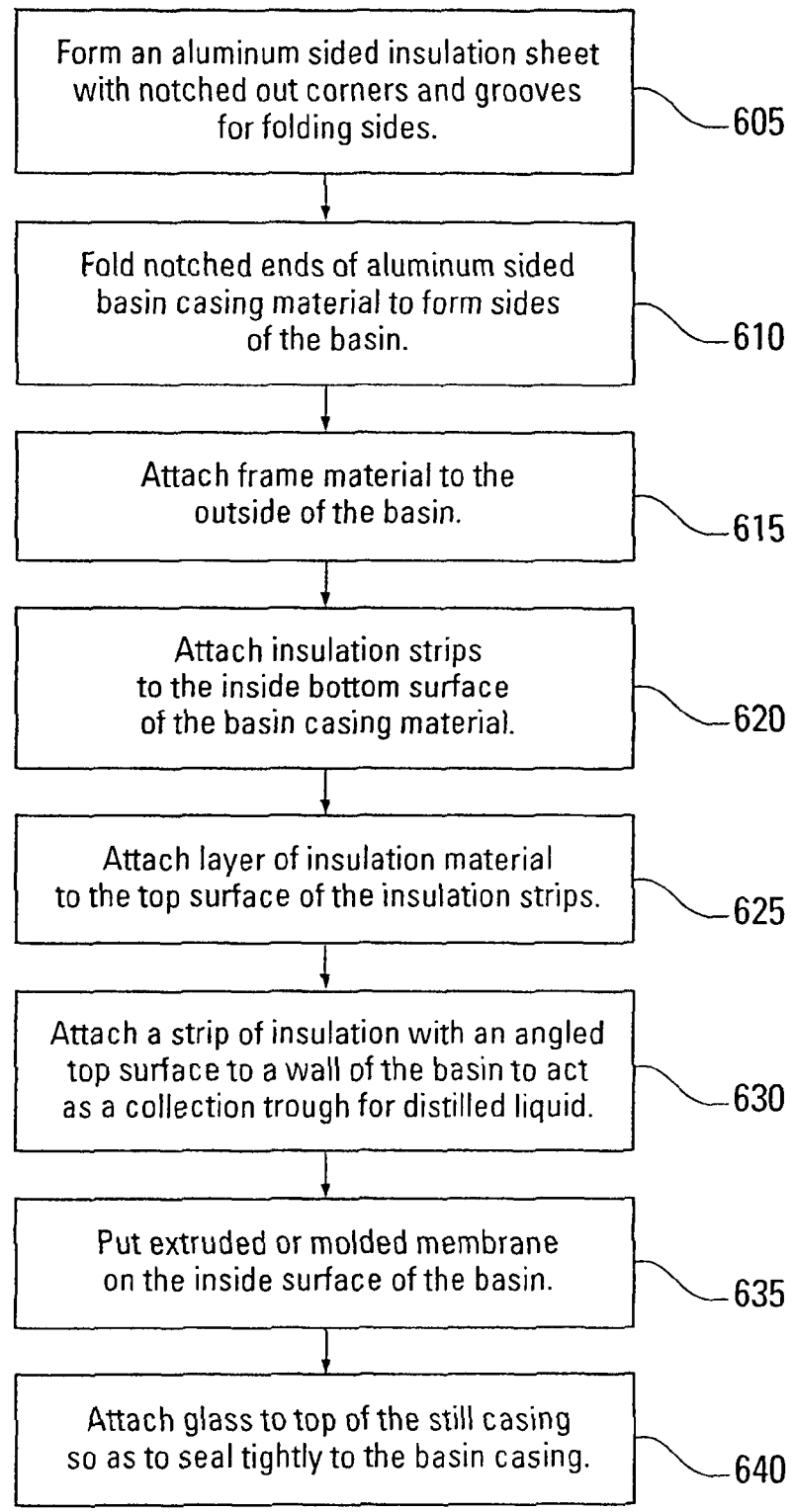
FIG. 6 illustrates a flow chart of one method for assembling a solar powered distillation system, according to one variation of the present invention.

Referring now to FIG. 6, one method of assembling a solar powered distillation system according to one variation of the present invention will be explained. First, at step 605, an aluminum sided insulation sheet 300 is formed to have corner notches and grooves for folding up side panels (see FIGS. 3A and 3B). Next, at step 610, the ends of the sheet 315A-315D are folded up, preferably perpendicular to the rest of the sheet, to form the sides of a solar power still basin casing 108. Then, at step 615, a structural framing 120 is attached to the outside corners of the aluminum sided basin casing to complete the basin casing 108. Of course, the structural framing 120 is not necessary as long as the ends of the sheet 315A-315D are secured in their upright position by, for example, securing their ends together with adhesive. Next, at step 620, one or more insulation strips 205 are attached to the bottom inside surface of the basin casing 108. Then, at step 625, a sheet of insulation 215 is attached to the one of more insulation strips 205. Of course, inclusion of the insulation strips 205 is not necessary and this step could be eliminated in one variation of the invention. In either case, next at step 630 a collection trough is created by attaching a strip of preferably insulation material having either straight or angled top edge, to the shorter side wall inside surface of the basin casing 108. The collection trough will collect distilled liquid and channel it to an output port. Then, at step 635, an extruded, vacuum formed, sprayed-on or molded membrane 110 is placed on the inside surfaces of the basin casing 108 to act as a liner. The membrane 110 may be attached to the inside surfaces of the basin casing 108 using, for example, a platinum cured silicone material such as Dow Corning 999-A. Next, at step 640, a glass panel is attached to the top of the still so as to seal the basin for efficient operation. The glass may be attached to the basin by using, for example, a bead of silicone, a rubber seal and locking mechanisms, or any other sealing method.

Figure 7:
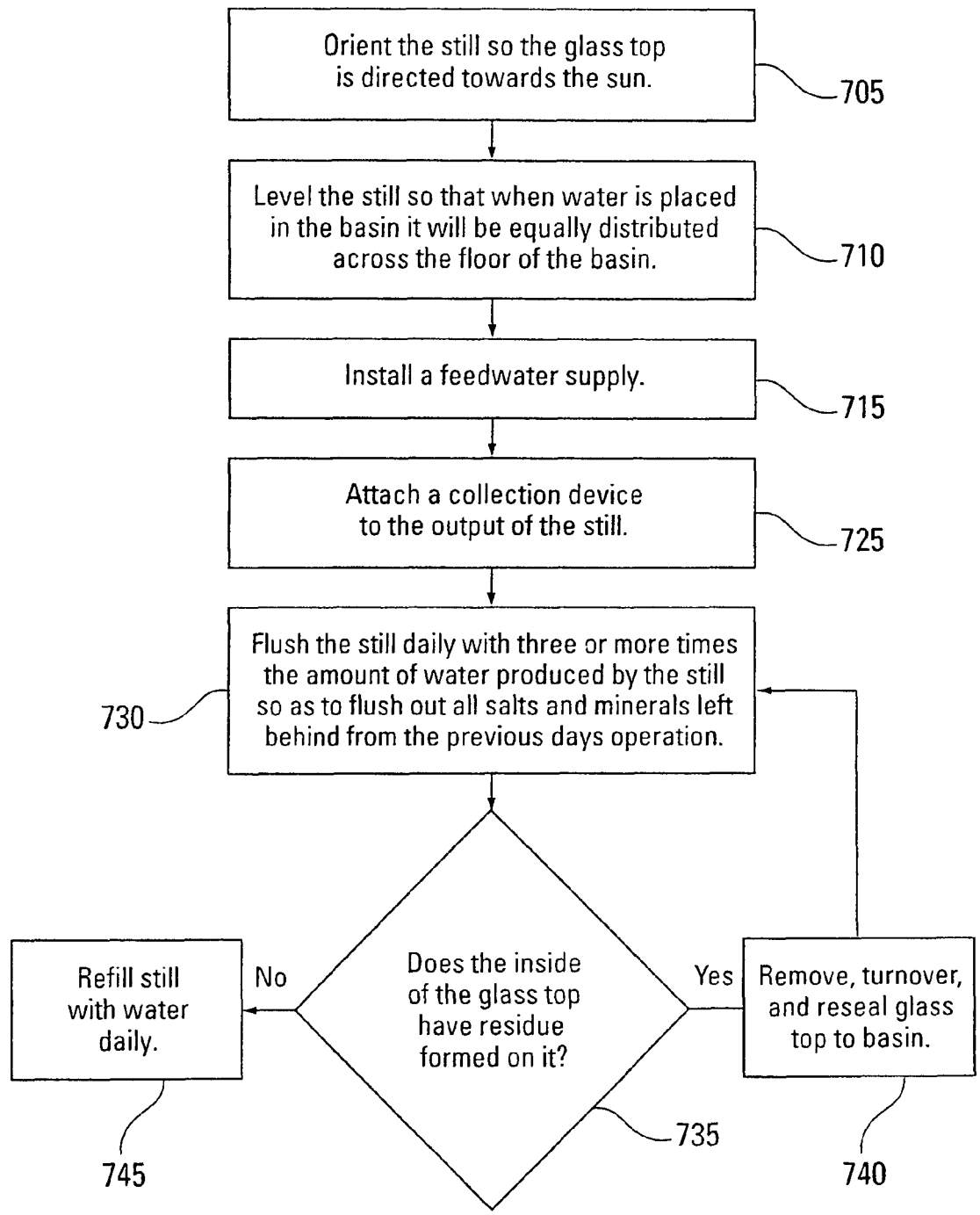
FIG. 7 illustrates a flow chart of one method of operating a solar powered distillation system, according to one variation of the present invention.

As discussed above, the invention may be used for distilling water to produce safe drinking water. One exemplary method for operating the solar powered distillation system for distilling drinking water is shown in FIG. 7. A solar still operates on the same mechanism that produces rainwater: evaporation. The solar powered distillation apparatus may be operated by introducing water into the inlet and recovering distilled water from the outlet. First, in step 705, for maximum output the still 100 should be place in a location receiving a maximum amount of sun and oriented to direct the angled glass top towards the sun. Next, in step 710, the still 100 should be leveled so that when the water is put in the still basin 105 the water covers the bottom of the basin 105 equally in all locations. This will also help to maximize distillation output. Next, at step 715, a feedwater supply is introduced into the still via an input port. The feedwater supply may be a bucket or other container attached to an inlet hose or a garden hose with pressurized water connected to the inlet hose. The feedwater is often times manually inputted using a container and is not required to be pressurized. Then at step 725, a collection device is connected to an output port, preferable via a silicone hose.

Once the system is flushed, the water to be cleaned is poured into the still 100 to partially fill the basin 105. The glass cover allows the solar radiation (short-wave) to pass into the still 100, which is mostly absorbed by the blackened base. The water begins to heat up and the moisture content of the air trapped between the water surface and the glass cover increases. The base of the membrane 110 also radiates energy in the infra-red region (long wavelength) which is reflected back into the still 100 by the glass cover. Thus, the glass cover traps the solar energy inside the still 100. The heated water vapor evaporates from the basin and condenses on the underside of the glass cover. The condensed water trickles down the inclined glass cover to an interior collection trough and is delivered to the collection device which may be, for example, a glass storage bottle. This procedure should be followed each day.

Next, at step 730, each day the still should be flushed with approximately three or more times the amount of water produced by the still daily to remove various salts and minerals left behind in the still from the previous days operation. Then, at decision step 735, it is determined whether the inside of the glass top has a residue formed on it. If the glass appears cloudy and the amount of distilled water production is less then normal it is likely that a residue has formed on the inside of the glass. This residue may cause resistance to the flow of condensed water along the glass top to the collection trough. If so, then large condensation droplets form along the glass top and fall back into the basin 105 before reaching the collection trough. If this occurs, then at step 740 the glass top is removed, turned over, and resealed to cover the basin 105. If not, then at step 745, the still 100 is refilled with water to be distilled.

Figure 8:
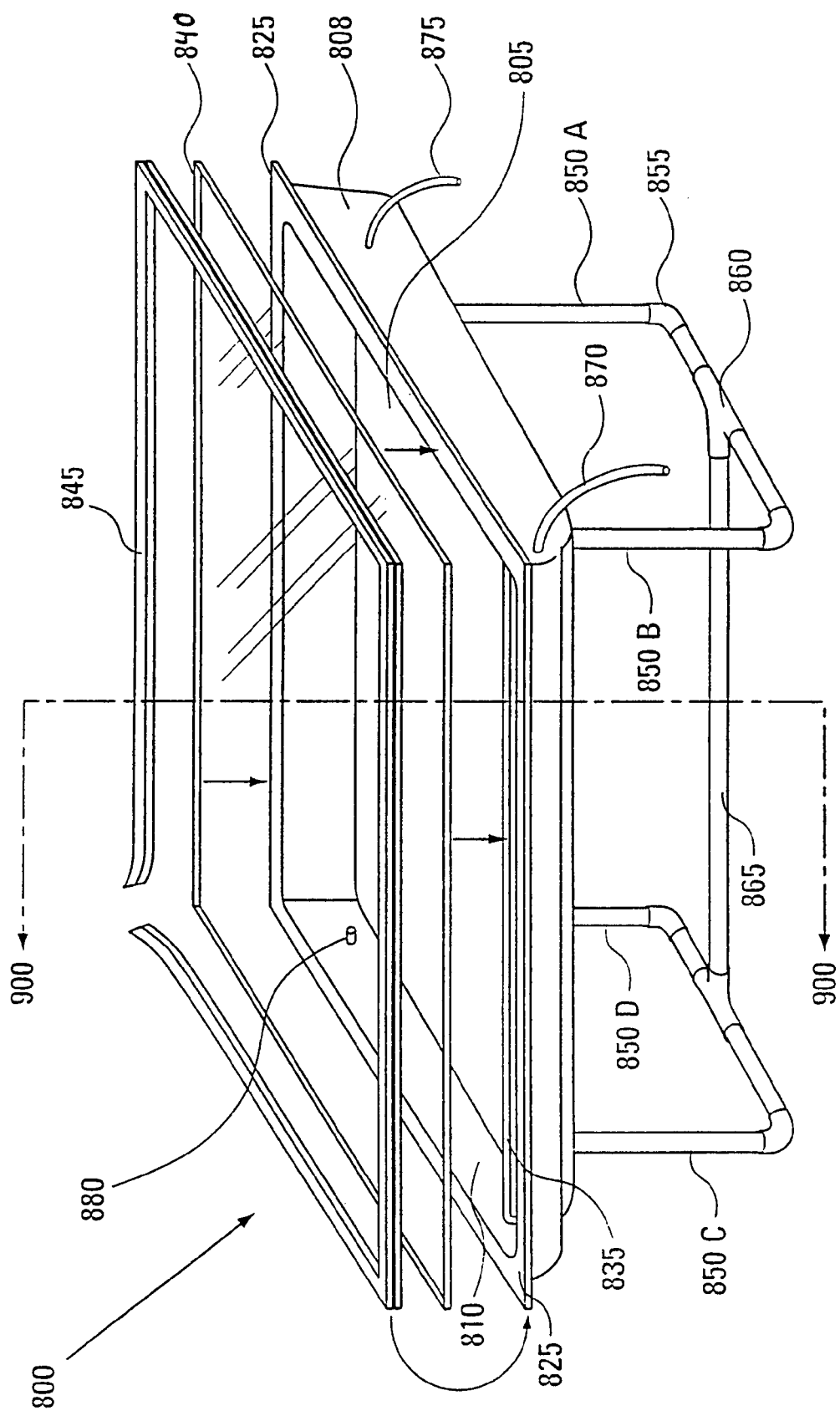
FIG. 8 is a perspective view of a still further exemplary solar powered distillation system, according to another embodiment of the present invention.

Another exemplary solar powered distillation system is illustrated in FIG. 8. The solar powered distillation system 800 includes a pre-distillation basin 805 and a post-distillation collection trough 835 that may be include in a basin casing 808, and an impermeable membrane 810 lining the interior surfaces of the basin casing 808. As in previous embodiments, the exterior of the basin casing 808 is preferably made of durable materials that will hold up to harsh climate conditions including extreme heat (e.g., desert operation). For example, in this case the basin casing may be vacuum formed or molded from a petroleum or plastics based product and the still may include legs that may be formed with a plastic or poly vinyl chloride (PVC) material. In one variation, the basin casing 808 may be comprised of fiberglass. In a preferred embodiment, the still basin casing 808 may be made of a structurally rigid and durable outside surface material such as a molded or vacuum formed acrylonitrile butadiene styrene (ABS) polycarbonate, polypropylene, or polybutylene. The basin casing 808 may be lined with an insulation material in between the basin casing 808 and the impermeable membrane 810. Although not shown in FIG. 8, the basin casing 808 exterior may be trimmed on its edges and corners with strengthening or reinforcement members to ensure the structural integrity of the basing casing 808, made of, for example, a more rigid plastic material or a metal such as aluminum.

The interior surface of the basin 805 serves at least two distinct purposes: retaining the liquid to be distilled and absorbing sunlight during distillation. The membrane 810 should be easily assembled into the basin 805. As such, in one embodiment the membrane 810 may be made of an opaque material which is extruded as a sheet and constructed or cut to form-fit into the basin 805. Alternatively, the membrane 810 may be molded or vacuum formed to form-fit into the basin 805, or sprayed-on to the inside of the basin 805. The membrane should be made of a material impervious to the liquid to be distilled and should not contribute contaminates to the solar distillation system. In distilled water applications the membrane may be made of non-toxic food grade materials (quality for contact with food) or water grade materials (quality for contact with water) compliant with ANSI/NSF Standard 61 for drinking water system components, so as to provide safe drinking water that tastes good. One such food grade material may be a blackened silicone, for example, Dow Corning 40/Silicone FDA ingredients per CFR 177.2600, that may be extruded into a sheet or molded into the shape of the basin casing 808 interior and collection trough 835, and attached to the interior surface of the basin casing 808. Another such food grade material may be a low out gassing, weather resistant, platinum cured silicone such as Dow Corning 999-A. Dow Corning 999-A may be comprised of hydroxy-terminated dimethyl siloxane of greater than 60% by weight and amorphous silica of between 10%-30% by weight. In one variation, Dow Corning 999-A may further contain methyltriacetoxysilane of between 1% and 5% by weight, ethyltriacetoxysaline of between 1% and 5% by weight, polydimethylsiloxane of between 1% and 5% by weight, and/or carbon black of between 0.1% and 1% by weight. The water grade material useful for the membrane 810 may be ANSI/NSF Standard 61 drinking water contact compliant grade materials such as silicones (SLC) that may be platinum cured, thermoplastic vulcanizates (TPV), polyether polyurethane, and fiberglass reinforced polyesters (FRPs). SLCs may include food grade silicones, for example, Dow Corning Silicone 732. Dow Corning 732 may be comprised of hydroxy-terminated dimethyl siloxane of greater than 60% by weight and amorphous silica of between 10%-30% by weight. In one variation, Dow Corning 732 may further contain methyltriacetoxysilane of between 1% and 5% by weight, ethyltriacetoxysaline of between 1% and 5% by weight, polydimethylsiloxane of between 1% and 5% by weight, and/or carbon black of between 0.1% and 1% by weight. FRPs may include, for example, a Bedford Reinforced Plastic Sheet. There are several TPV subtypes including thermoplastic elastomers (TPEs), thermoplastic rubbers (TPR), Thermoplastic olefins (TPO), and ethylene propylene terpolymer rubbers (EPDMs). One exemplary TPV is Sarlink 5000. One exemplary TPF is Uniprene 7010-40D NT Black manufactured by Teknor Apex Company and may be comprised of an ethylene propylene diene monopolymer that may be block vulcanized with homopolymer propylene. One exemplary TPR is Santoprene 143-50 manufactured by Advanced Elastomer Systems. In any case, it is useful that the material used for the membrane have a long service life and does not degrade in the presence of ultraviolet rays from the sun. The use of a dark or blackened membrane material will help improve absorption of the sun's rays so as to increase the heating of the solar powered distillation system and distillation production. In a preferred embodiment, all still materials may be made of ANSI/NSF Standard 61 and the entire still and system may be ANSI/NSF Standard 62 qualified for approval as an ANSI/NSF compliant drinking water distillation system.

The solar powered distillation system 800 may be closed by covering the basin 805 with a piece or sheet of transparent material 840 such as clear plastic, glass, tempered glass, Plexiglas, tempered safety glass, etc. The transparent material 840 is preferably a tempered glass and attached to a sill 825 integrally formed with the still basin casing 808. Preferably the sill 825 may be covered with membrane material 810. The transparent material 840 should seal the basin to produce a sealed solar powered distillation system 800 that retains as much solar heat as possible. In one preferred embodiment, the transparent material 840 may be removably attached to the basin sill 825. For example, the transparent material 840 may be attached or clamped down using a rubber and metal seal 845 having, for example, a C shape or grove. This feature will be shown more clearly in FIG. 12. In one variation, the transparent material 840 may be placed in a sliding sleeve. Alternatively, the transparent material 840 may be attached to the basin sill 825 with a food or water grade silicone such as those listed above.

In one embodiment, the solar power distillation system may also include legs and various inlet and outlet ports with tubes. First, vertical legs 850, preferably four legs 850A-850D, are provided so that the basin 805 may be easily set up and leveled for maximum distillation efficiency. The vertical legs 850A-850D may be tubing and removably attached to the bottom or sides of the basin casing 808. In a preferred embodiment the vertical legs 850A-850D may be fitted into female fitting portion or over a male fitting portion formed on the bottom of basin casing 808 (as will be shown in more detail in FIG. 11). Further, the vertical legs 850A-850D may be coupled together using a plurality of L joints (e.g. 855), T joints (e.g., 860) and straight pieces (e.g., 865). The various pieces may be fastened to one another and the vertical legs 850A-850D using standard fasteners and/or glue. Most importantly, the L joints are attached to the vertical legs 850A-850D and their respective straight pieces 865. In this manner, the legs can adequately support the solar distillation basin and its attachments filled with liquid. In a preferred embodiment the vertical legs 850A-850D and their related joints and straight pieces (e.g., 855, 860, 865) may be made of a poly vinyl chloride (PVC) using, for example, a schedule 80 or 40 pipe (e.g., 1" diameter pipe). The PVC is preferably of a dark grey color so as to hold up better in hot sunny climates (e.g., deserts). The vertical legs 850A-850D and their related joints and straight pieces may be stored in the still basin for shipping.

Of course, as shown in earlier embodiments the legs may be removable, adjustable and/or retractable. For example, vertical legs 850A-850D may be folding legs so that they may be folded parallel to the underside of the still basin casing 808 for convenient shipping, carrying, and storage. The legs 850 may further be affixed to the basin with a quick disconnect bracket.

The solar powered distillation system may also include an inlet port and hose 880, an overflow outlet port and hose 875, and an outlet port and hose 870. The hoses may be made of a flexible silicone based material and be food grade and/or water grade. Further, a carbon filter (not shown) may be provided on the inlet port 880 or the outlet port 870 so as to filter out VOCs that may not be completely removed during the distillation process. The carbon filter will remove VOCs such as pesticides and petroleum distillates from, for example, a source water supply or distilled water output by the system. In a preferred embodiment the carbon filter is connected to the inlet port and hose 880.

Figure 9:
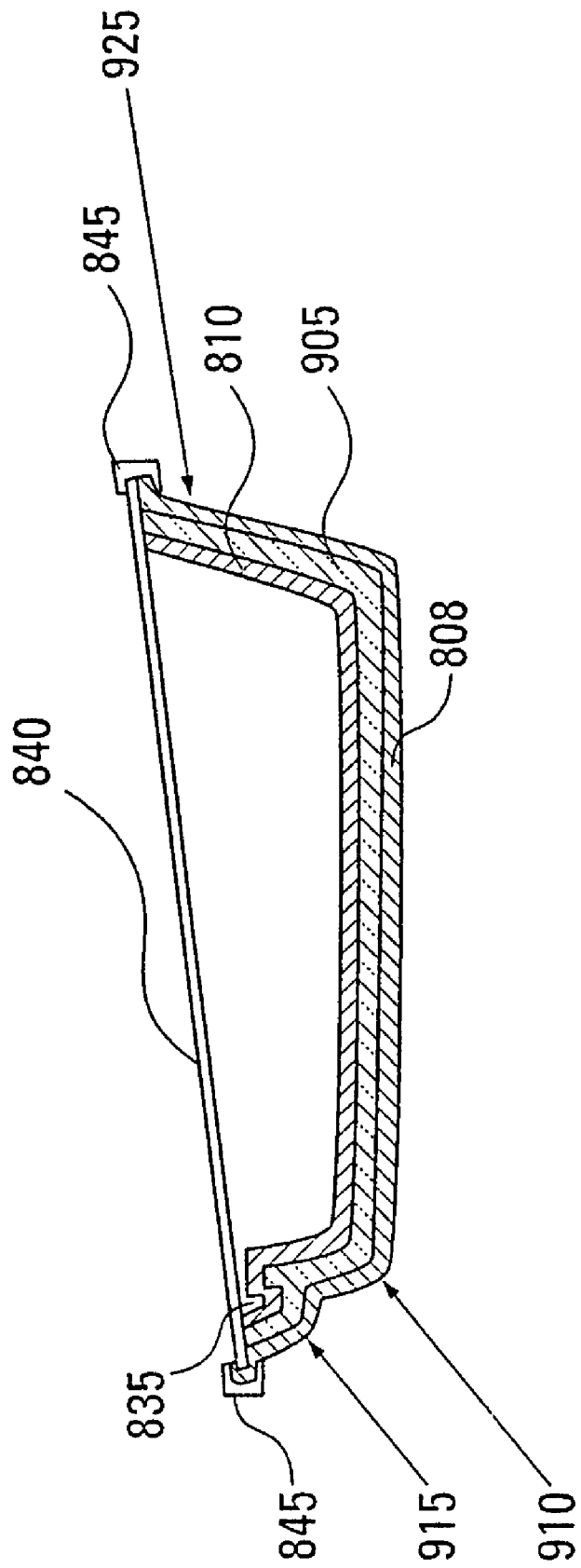
FIG. 9 is a cross section view of the basin of the exemplary solar powered distillation system shown in FIG. 8, according to one embodiment of the present invention.

Referring now to FIG. 9, a cross section view of the still basin 805 is shown, as taken viewed from line 900-900 of the solar powered distillation system shown in FIG. 8. The still basing casing 808 is formed of, for example, an ABS plastic using, for example, a vacuum molding, blow molding, or injection molding process. Other still basin casing materials, for example, polycarbonate and/or polybutylene, are also possible so long as they are sufficiently rigid and strong. In one variation the basin casing 808 may be made of fiberglass, such as a vacuum formed fiberglass casing. The vacuum formed fiberglass may be formed using, for example, a process such as closed cavity bag molding (CCBM). Two curved portions 910 and 915 are formed in the front side of the still basin casing 808 to create a sill to form the collection trough 835 and provide rigidity to the basin casing 808. Next, an insulating layer 905 may be formed on the inside of basin casing 808. The insulating layer 905 may be formed using a molding process such as vacuum molding, blow molding, or injection molding and be generally conformal to the shape of the still basin casing 808. Although, the insulating material may be thicker in some areas than others to achieve the particular insulating properties and interior basin dimensions desired. In one variation the insulation layer 905 may be sprayed onto the still basin casing 808. The insulation layer 905 may be, for example, polyisocyanurates, Styrofoams, or other light weight materials which have good insulating properties. Then, membrane layer 810 is formed over and/or attached to the insulating material 905. In this case, membrane layer 810 is conformal to the insulating material layer 905. Next, the transparent material 840 may be attached or clamped down to a lip portion of the basin casing 808 which forms the basin sill 825, using a rubber and metal seal 845 having, for example, a C shape or grove. Further, note that in one embodiment side 925 has a slight open angle from the bottom to the top of the still basin 805, rather than being perfectly perpendicular to the bottom planar surface of the still basin 805. This slight angle assists in stacking one still basin on top and inside another still basin for improved storage, shipping, and handling. Further, it is noteworthy that the transparent material 840 has a slight upward slope from the front of the still basin 805 to the back (925) of the still basin 805 so that the still basin can operate with the bottom of the still basin level and the condensed water from the still will then collect on the transparent material 840 and flow down to the front of the still basin 805 and collect in the trough 835.

Figure 10:
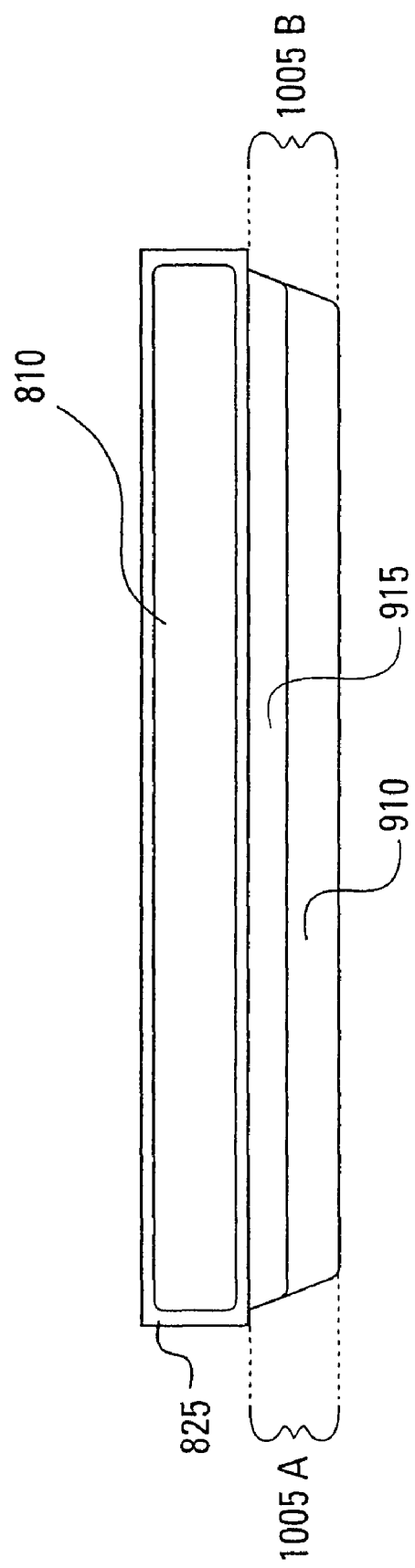
FIG. 10 is a front view of the basin of the exemplary solar powered distillation system shown in FIG. 8, according to one embodiment of the present invention.

FIG. 10 illustrates a front view of the basin 805 for the exemplary solar powered distillation system shown in FIG. 8. As noted with reference to FIG. 9, there are two curved portions 910 and 915 that are formed in the front side of the still basin casing 808 to create a sill to form the collection trough 835 on the inside of the basin (not shown). The curved portions also provide rigidity to the basin casing 808 and assist in stacking one still basin on top and inside of another still basin for ease of storage, shipping and handling. Similarly the left side 1005A and right side 1005B of the still basin casing 808 are sloped outward from the bottom to the top of the still basin 805, for ease of storage, shipping and handling. In one variation, all four sides of the still basin casing 808 may be sloped outward from the bottom to the top of the still basin 805 so that the sides and bottom of the still basin casing 808 receive minimal direct sunlight and improve long term reliability of the still basin casing. As shown in FIG. 8, the still basin 805 is covered on the inside with a membrane 810 and the still basin 805 has a sill 825 for supporting and attaching thereto a transparent material 840, e.g., a tempered glass plate.

Figure 11:
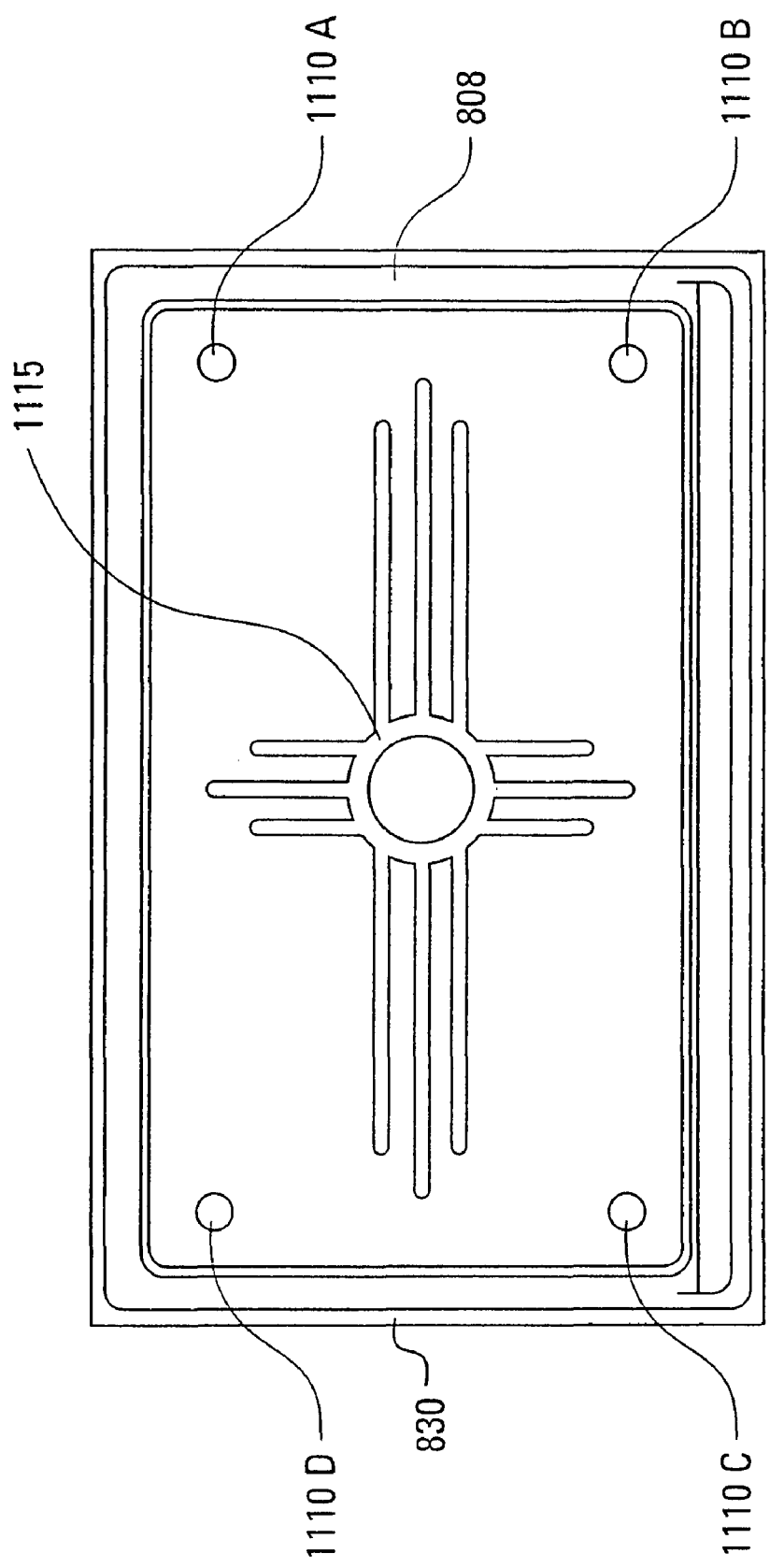
FIG. 11 is a top view of one possible basin casing of the exemplary solar powered distillation system shown in FIG. 8, according to one embodiment of the present invention.

FIG. 11 is a top view of one possible basin casing 808 of the exemplary solar powered distillation system shown in FIG. 8. The still basin casing 808 may include one or more strengthening members to support the weight of the water in the still basin 805 and improve the rigidity of the still basin, and may be connected to or formed in the basin casing 808. For example, a contour may be provided in the bottom of the still basin casing 808. In the case of a molded basin casing, the design may be formed integral to the basing casing during the molding process. This is particularly applicable to a molded basin casing 808 made of a plastic including, for example, ABS, polycarbonate and/or polybutylene. The contour may be concave or convex relative to the inner surface of the still basin 805 and may be of any design sufficient to give strength and rigidity to the bottom of the still basin 805. For example, as shown in this embodiment, a sun design 1115 may be formed on the bottom surface of the still basin casing 808. Another possible shape would be a basic X or cross shape. In any case, each arm of the basic shape (e.g., sun, cross, X) may include one of more fingers as may be needed to obtain the rigidity and strength in the bottom of the still basin 805 and may be oriented in any direction along the bottom surface. In a preferred embodiment, the fingers have a sufficient width and depth so as to have additional strengthening and rigidity when coated with an insulating material and/or membrane material.

The bottom of the basin casing 808 may also have a plurality of fittings for attaching legs to support the basin casing, or simply to act as supports if the still basin is set on a table top. For example, circular female or male fittings 1110A-1110D may be formed in the bottom of the basing casing 808 as shown in FIG. 11. In a preferred embodiment the fittings are female fittings as viewed from the underside of the basin casing 808 and the round legs 850A-850D made of 1 inch PVC piping fit snuggly in the female fittings 1110A-1110D so that they fit snug and are held in with friction. Each of the female fittings 1110A-1110D may have an open end for receiving the legs 850A-850D and a closed end for stopping the legs 850A-850D from being inserted further. The female fittings 1110A-1110D may also have a slight taper from open end to closed end and/or a ribbed side wall cylinder to enhance the friction fit of the legs 850A-850D. In the case that the fittings are to support the basing casing 808, with or without legs, the fittings would be male fitting protruding out from the bottom surface of the basin casing. The fittings 1110A-1110D and legs 850A-850D may include threads so as to thread together and offer one means of adjustment for leveling the still basin 805. Of course, the fittings 1110A-1110D need not be circular as shown in the exemplary embodiment of FIG. 11, but may indeed be of any convenient and useful shape such as a square, star, etc.

Figure 12:
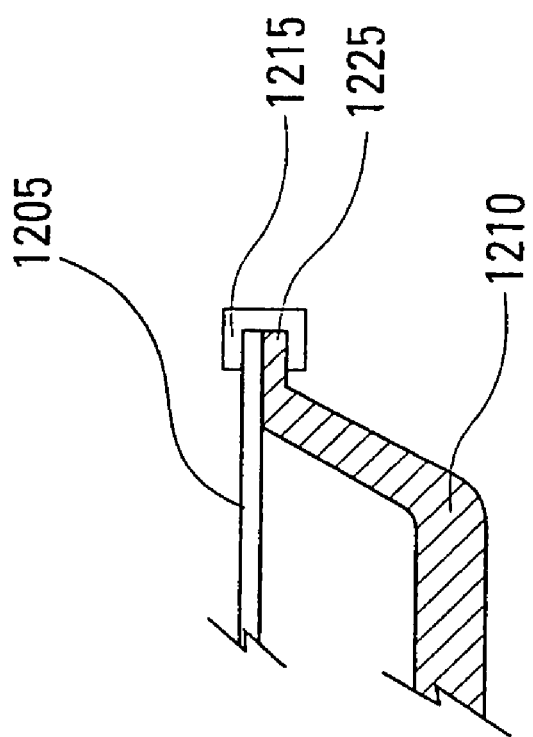
FIG. 12 is a partial cross section view of one method used to couple a sheet of glass to the basin casing of the exemplary solar powered distillation system shown in FIG. 8, according to one embodiment of the present invention.

Referring now to FIG. 12, a partial cross section view is shown of one method used to couple the transparent layer, for example a tempered sheet of glass, to the basing casing of the solar powered distillation system. The basin 1210 may include a basin casing with insulation and a membrane layer formed thereon. A transparent layer 1205, for example a sheet of tempered glass, is placed on the sill or lip 1225 of the basin 1210. A spring loaded trim strip 1215 is pushed onto the combination lip 1225 and transparent layer 1205 so as to clamp and friction seal the transparent layer 1205 to the basin lip 1225. The spring loaded trim strip may be made of a rubber coated C or U shaped metal strip. In one variation the combination may create an air tight seal, such as Trimlock. In one variation an adhesive such as silicone could be also applied to help create an air tight seal of the transparent layer 1205 and the basin lip 1225. In this case the spring loaded trim strip need not be covered with rubber. Of course, as in the earlier embodiments, the transparent layer 1205 may be sealed to the basin lip 1225 with only an adhesive such as a silicone, without the use of a spring loaded trim strip.

The membrane and/or basing casing may be formed to include a plurality of liquid retention areas in a single still basin. One embodiment of the present invention may include a stair stepped membrane having a plurality of liquid retention reservoirs or areas in the still basin as shown by the exemplary illustration in FIG. 13. In this case the membrane 1315 is formed to be stair stepped and have 3 primary liquid retention areas such as liquid retention areas 1305A, 1305B and 1305C. However, there may be any number of separate liquid retention areas formed in the membrane 1315. The multi stair-step approach can be designed to increase overall evaporative areas for the feed water supply, thus increasing distillate production; in addition, the stair-step approach can be designed in such a manner as to decrease convective heat losses within the still, also furthering overall distillate production. In addition, there may be an overflow area 1330 formed in the membrane 1315 between the distillate collection trough and feed water troughs, thus decreasing likelihood of potential crossover contamination of feed water by reducing the possibility of feed water entering the distillate collection trough. This also serves as an overflow trough for when the feed water collection areas are full of water. As shown, in one embodiment the insulation layer 1310 may be formed conformal to the still basin casing 1308, similar to the single liquid retention area membrane embodiments. The various insulation layers 905 may be, for example, polyisocyanurate, Styrofoam, or other light weight materials that have good insulating properties. In this case an open airspace 1320 may be formed between the bottom of the membrane 1315 and the top of the insulating layer 1310 under the primary liquid retention areas 1305A-1305C. In variations of this embodiment, as in previously describe embodiments, the airspace may include strips of insulating material that physically support at least a portion of one or more of the primary liquid retention areas 1305A-1305C, or be completely filled with insulating material.

The multiple liquid retention reservoir membrane 1315 may be formed from an extruding or molding process and formed to fit into the still basin. Again, the membrane 1315 should be made of a material impervious to the liquid to be distilled and should not contribute contaminates to the solar distillation system. In distilled water applications the membrane 1315 may be made of, for example, non-toxic food grade materials (quality for contact with food) or water grade materials (quality for contact with water), so as to provide safe drinking water that tastes good. One such food grade material may be a platinum cured blackened silicone, for example, Dow Corning 40/Silicone FDA ingredients per CFR 177.2600, that may be extruded into a sheet and folded to obtain the multiple reservoirs, or molded into the multiple reservoir shape that will fit in the basin casing 1308 interior and collection trough 1325, and attached to various interior surfaces of the basin casing 1308. Another such food grade material may be Dow Corning 999-A. The water grade material useful for the membrane 810 may be ANSI/NSF Standard 61 grade materials for drinking water system components, as indicated above, such as silicones (SLC) like Dow Corning Silicone 732, fiberglass reinforced polyesters (FRPs), thermoplastic vulcanizates (TPV) such as Sarlink 5000, thermoplastic elastomers (TPE) such as Uniprene manufactured by Teknor Apex Company, thermoplastic rubbers (TPR) such as Santoprene manufactured by Advanced Elastomer Systems, thermoplastic olefins (TPO), and EPDMs.

Figure 13:
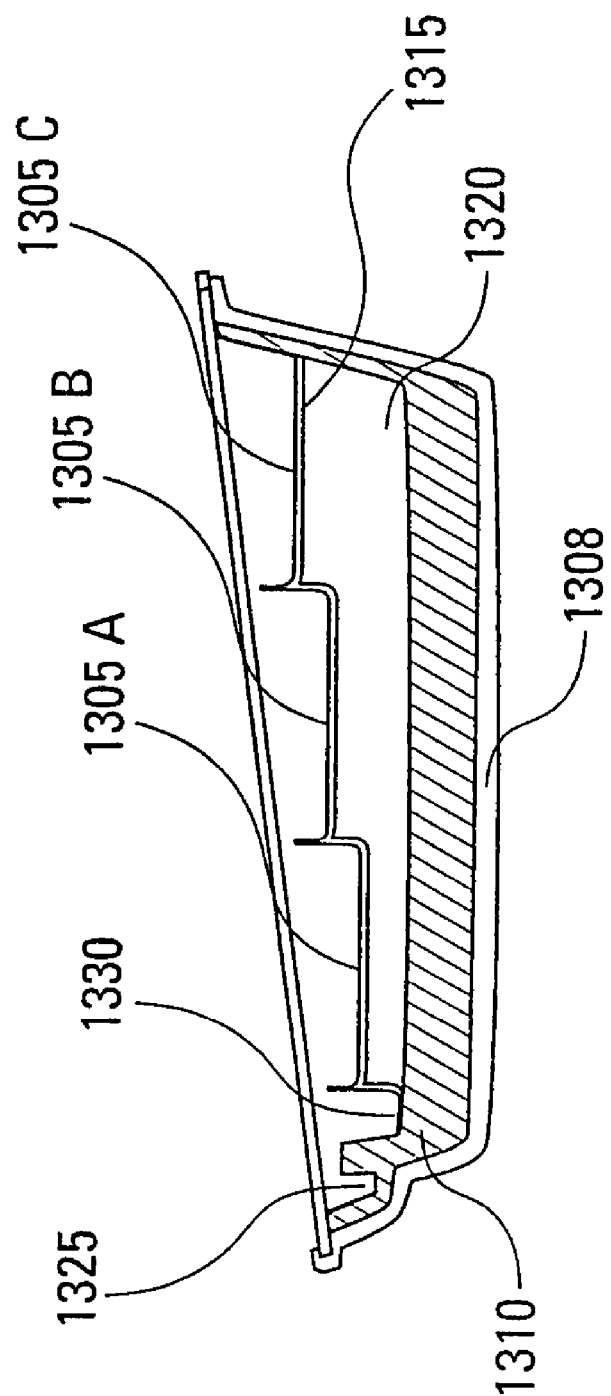
FIG. 13 is a cross section view of a basin of one exemplary solar powered distillation system including a stair step multiple water retention area membrane, according to one embodiment of the present invention.
Figure 14:
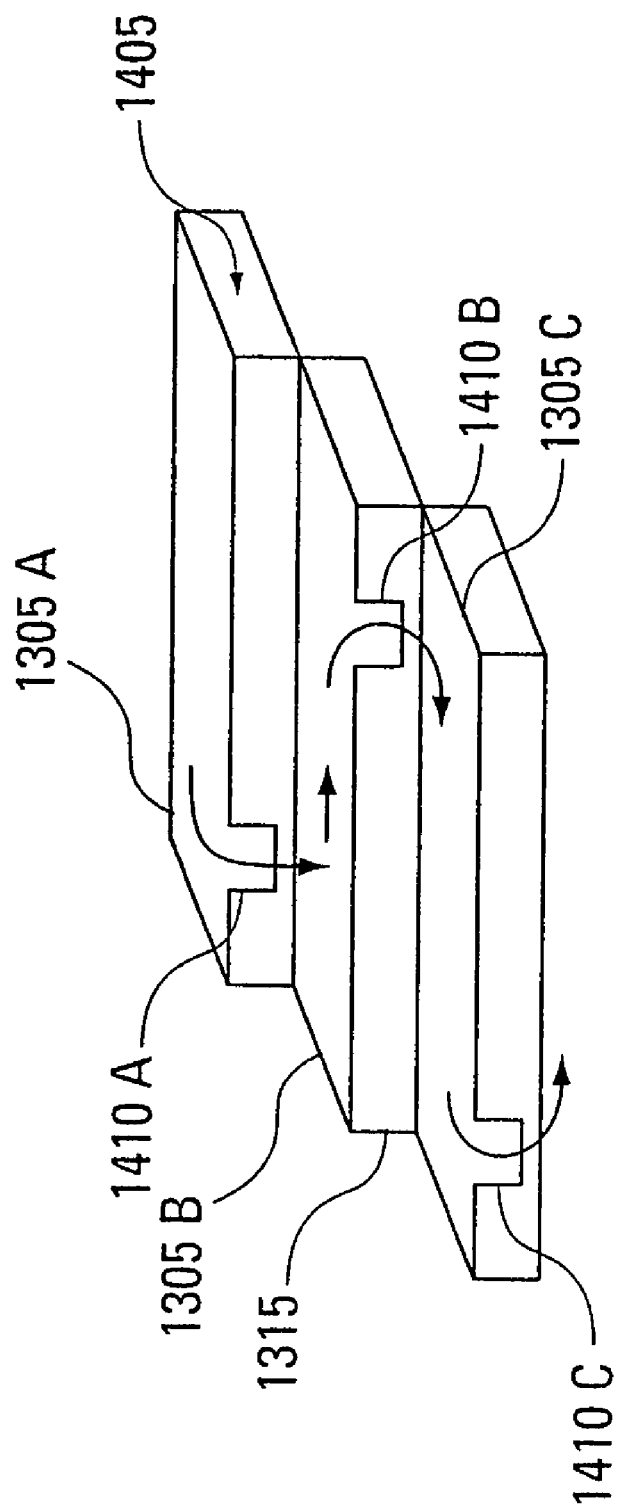
FIG. 14 is a perspective view of the fluid flow for the stair step multiple water retention area membrane shown in FIG. 13, according to one embodiment of the present invention.

Referring to FIG. 14, a perspective view of the fluid flow and fluid level setting notches for the stair step multiple liquid retention reservoir membrane shown in FIG. 13 is provided. Each of the separate liquid retention reservoirs 1305A-1305C includes a fluid level setting notch 1410A-1410C, respectively, that sets the fluid level in each of the respective liquid retention areas and creates the flow of the liquid from one reservoir to another. The curved arrows starting with 1405 show the fluid flow of the liquid, for example water, that is introduced into the solar distillation still. The fluid is first introduced into liquid retention area 1305A on the right side and flows to the fluid level setting notch 1410A. The excess liquid introduced into reservoir 1305A flows through level setting notch 1410A and enters the left side of reservoir 1305B, then flows to the right side of reservoir 1305B. Any excess liquid that enters reservoir 1305B will flow through level setting notch 1410B and enter the right side of reservoir 1305C. This liquid then flows right-to-left in reservoir 1305C. Any excess liquid in reservoir 1305C will flow through level setting notch 1410C and into an overflow area. The level setting notches 1410A-1410C may be set at different heights or at the same height so as to set the fluid levels in the respective reservoirs at different or the same depth. Optimal water level height for evaporation is to maintain a minimal level as is practical, never to exceed more than one inch and preferably only one quarter inch or less.

Figure 15:
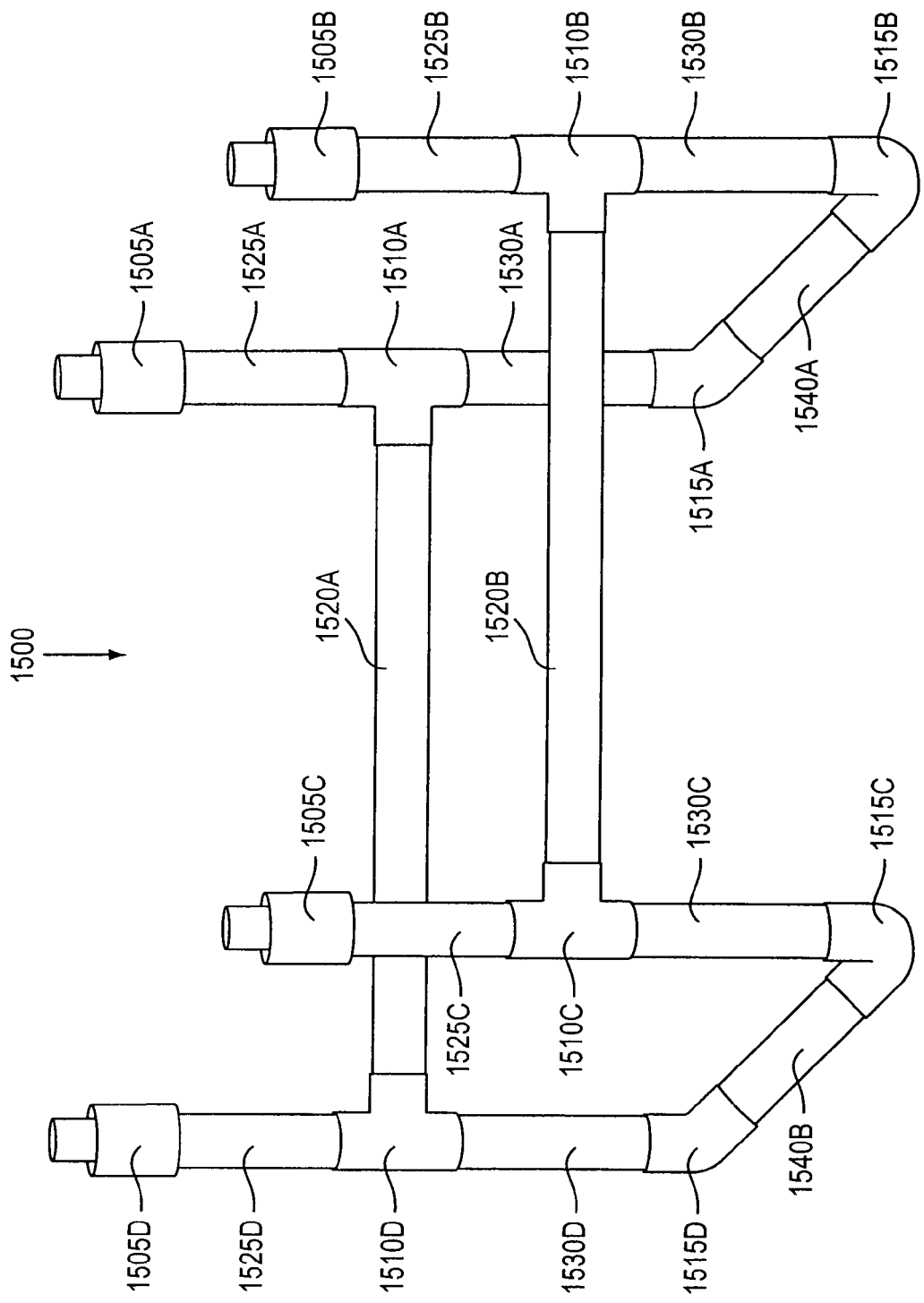
FIG. 15 shows a perspective view of a leg arrangement for supporting a solar distillation basin, according to one embodiment of the present invention.

Referring now to FIG. 15, another support leg assembly is shown for supporting and leveling a still basin similar to those shown above and further still basin designs described below. The support leg assembly may be provided so that the still basin may be easily set up and leveled for maximum distillation efficiency. It is noteworthy that the leg assembly 1500 has a plurality of horizontal connecting members 1520A and 1520B that couple together two opposing pair of vertical legs and are not located at the bottom of the leg assembly and four basin support coupling members 1505A-1505D located on top of the four vertical legs. The horizontal members 1520A and 1520B arrangement improves the stability of the vertical legs when the still is filled with water and improves ease of still leveling by reducing the area touching the ground. Further, as will be described in more detail below with reference to FIGS. 16A and 16B, including the four basin support couplings 1505A-1505D improves support of the fully loaded weight of the still basin on the leg assembly.

The leg assembly may be comprised of, for example, four vertical support legs. The four vertical support legs may be comprised of three sections, for example: (1) straight section 1525A, T shaped section 1510A, and straight section 1520A; (2) straight section 1525B, T shaped section 1510B, and straight section 1520B; (3) straight section 1525C, T shaped section 1510C, and straight section 1520C; and (4) straight section 1525D, T shaped section 1510D, and straight section 1520D. The vertical support leg sections may be, for example, tubing, piping, or solid rods with hollowed out T shaped fittings 1510A-1510D, and removably attached to the bottom or sides of a still basin casing (e.g., basin casing 808) using, for example, basin support couplings 1505A-1505D. In a preferred embodiment the vertical support legs may be fitted into female fitting portion using the male oriented basin support couplings 1505A-1505D, or over a male fitting portion formed on the bottom of a basin casing using, for example, an inverted basin support coupling in which the male end of the coupling is inserted into a female end on top of straight sections 1525A-1525D (see, for example, the detailed description of FIG. 11 above). Opposing vertical leg sections may be coupled together on the opposite ends using a plurality of L joints or elbow sections 1515A-1515D coupled together with horizontal straight sections 1540A and 1540B, and horizontal straight sections 1520A and 1520B couple to four T joints 1510A-1510D. In one alternative, the longer horizontal straight sections 1520A and 1520B may be placed on the lower end of the vertical leg sections and coupled with L joints or elbow sections 1515A-1515D, and the shorter vertical straight sections 1540A and 1540B could be moved to the middle of the vertical leg sections and coupled each between two T joints 1510A-1510D.

In any case, the various pieces of the leg support assembly 1500 may be fastened to one another using, for example, friction, pressure, compression, standard fasteners, threads, and/or glue. Of course, given the weight of the still basin when filled, much of the vertical support leg sections may be simply assembled male-female and held together by the weight of the basin still with attachments and liquid fill. Assembled in this manner, the legs can adequately support the solar distillation basin and its attachments filled with liquid.

The vertical leg sections and their related couplings, joints and straight pieces (e.g., 1505, 1510, 1520, 1525, etc.) may be made of, for example, a plastic pipe such as poly vinyl chloride (PVC) using, for example, a schedule 80 or 40 pipe (e.g., 1" diameter pipe), a metal pipe, or wood such as bamboo. If used, the PVC pipe may be preferably of a dark grey color so as to hold up better in hot sunny climates (e.g., deserts). The vertical support leg sections and their related joints and straight pieces may be stored in the still basin unassembled or partially assembled for shipping. Similar to the various other leg embodiments described herein, the leg assembly shown in FIG. 15 may include legs that are removable, adjustable and/or retractable, and/or the legs may be affixed to the basin with a quick disconnect mechanism(s).

Figures 16A, 16B:
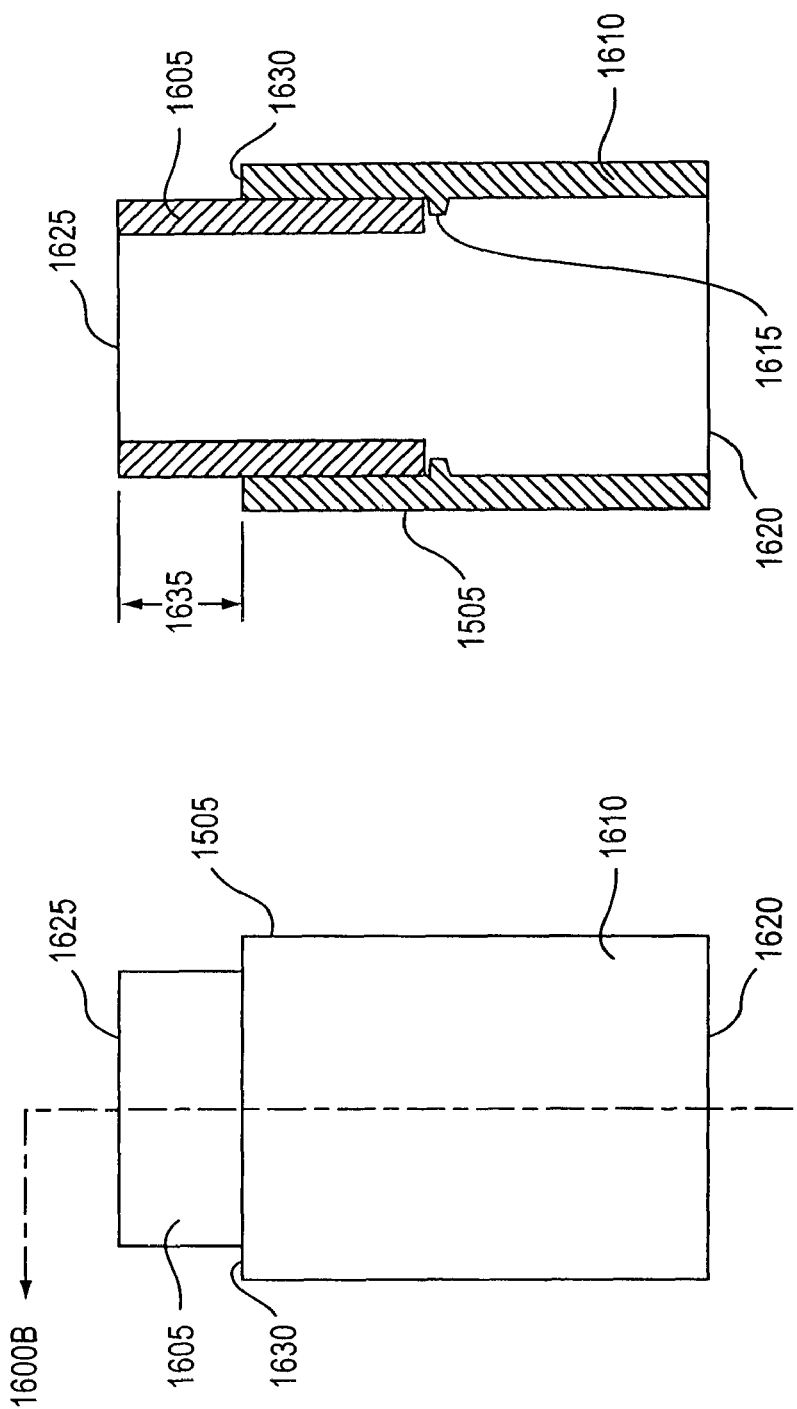
FIG. 16A shows a side view of a basin support coupling for mounting a solar distillation basin to leg supports, according to one embodiment of the present invention.
FIG. 16B shows a cross section of the basin support coupling of FIG. 16A, according to one embodiment of the present invention.

Referring now to FIGS. 16A and 16B, a more detailed description of the basin support couplings 1505A, 1505B, 1505C, and 1505D will now be provided. FIG. 16A shows a side view of one of the basin support couplings 1505 and FIG. 16B shows a cross section of the basin support coupling 1505 taken across line 1600B. Basin support coupling 1505 may have a narrower section 1605 including a male end 1625 and a wider section 1610 having a female end 1620. In one embodiment, basin support coupling 1505 may be made of a first cylinder 1610 having an internal ridge 1615 and a second cylinder 1605 that is placed into one end of the first cylinder 1610. Ridge 1612 may be located at the midpoint of the length of the first cylinder 1610. In this case, when using plastic or PVC pipe, a standard coupling may be used for the first cylinder 1610 and a standard plastic or PVC pipe may be cut to the desired length for the second cylinder 1605. The second cylinder 1605 may be adhesively attached to the inside of the first cylinder 1610 and abutted to the ridge so as to form the basin support coupling 1505. In alternative embodiments, the first cylinder 1610 may have a larger ridge 1615, may be tapered instead of having a ridge, or need not include a ridge 1615. Further, although the narrower section 1605 is shown as a cylinder in this case, one skilled in the art would appreciate that it may be a solid piece of material.

As shown in FIG. 15, in one embodiment a basin support coupling 1505 is placed on each of the support legs by inserting a vertical straight section 1525 of the leg into a hole in the female end 1620 of the basin support coupling 1505. In this case, the length 1635 of the narrower section 1605 that extends out of the wider section 1610 may be approximately the same length as the depth of a hole formed in a basin casing that the leg is to be connected. In this way, the basin support coupling 1505 provides two surface areas for interfacing with the basin casing, surfaces 1625 and 1630, so as to provide greater leg support surface for added still basin support and durability. In one variation, the length 1635 may be slightly longer than the depth of the basin casing leg attachment hole and a washer having greater outside diameter than the wider section 1610 may be included so as to offer even greater support surface area interface between the basin casing and the vertical support legs for stable and durable holding of the still basin with the leg assembly 1500. In the variation where the basin support coupling 1505 is inverted so that the male end 1625 is inserted into a hole in the top of the support legs and a male stud portion extending from the bottom of the still basin is inserted into a hole in the female end 1620 of the basin support coupling 1505, the male stud portion and depth of the hole in the female end 1620 of the basin support coupling should be made approximately the same to get more surface area interface between the two portions. In this case, it may be best that ridge 1615 is not used so as to get as much surface interface as possible. The amount of surface interface may be further increased by using a solid piece of material for the narrower section 1605 and/or adding a washer between the female end 1620 of the basin support coupling 1505 and the bottom of the still basin.

Figure 17B:
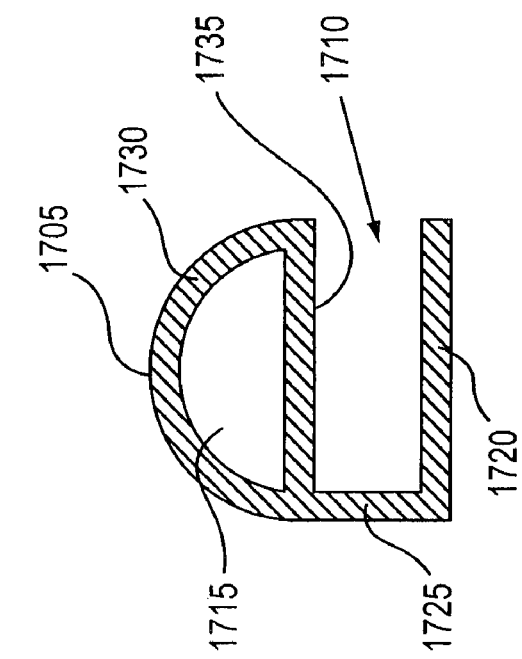
FIG. 17B shows a cross section of the seal strip or gasket of FIG. 17A, according to one embodiment of the present invention.
Figure 17A:
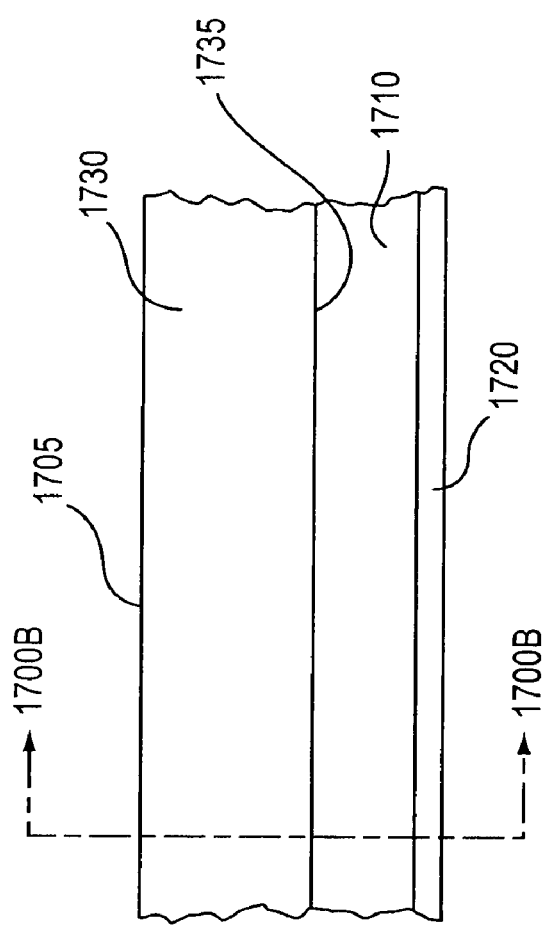
FIG. 17A illustrates a portion of a seal strip or gasket for sealing a transparent sheet on the solar still, according to one embodiment of the present invention.

FIGS. 17A and 17B illustrate a seal or gasket 1705 for sealing the still basin to a transparent basin covering. Although the seal or gasket 1705 may be used with may different still designs, including the solar powered distillation system design shown above in FIGS. 1-5, it is particularly well suited for use with solar powered distillation systems similar to that shown and described above for FIGS. 8-14 and will for convenience be describe with reference thereto. For example, referring to FIG. 8, the seal or gasket 1705 may be designed to attach to basin sill 825 and wrap around the perimeter of the basin sill 825, similar to the rubber and metal seal 845. In a preferred embodiment, the seal or gasket 1705 may be used in conjunction with rubber and metal seal 845, as will understood better with the detailed explanation given below for FIG. 18.

In one embodiment, the seal or gasket 1705 may be an elongated strip formed in its cross section in the shape of an "e" (or backward facing "e"). A side view of a portion of the elongated strip seal or gasket 1705 is shown as in FIG. 17A. A cross section of the seal or gasket 1705, taken at section line 1700B, is shown in FIG. 17B. The seal or gasket 1705 may have an upper portion 1730 that has a hollow center 1715, so as to be and enclosed tubular in shape. The outer portion of upper portion 1730 may be a rounded semicircle on one side which enables an outward pressure or force when pressed upon and a flat portion 1735 on the opposite side for seating to the basin sill 825. Further, the seal or gasket 1705 may also include a first lower portion 1725 extending approximately perpendicular with the upper portion 1730, connected at one end to one side thereof, and a second lower portion 1720, connected to the other end of the first lower portion 1720, and running approximately parallel with a flat side 1735 of the upper portion 1730. The flat portion 1735 of the upper portion 1730, the first lower portion 1725, and second lower portion 1720, operate in conjunction to form channel 1710 that may be slid over the outer end of the basin sill 825. The seal or gasket strip may be made to fit at the corners by, for example, stretching it around the corners or cutting the strip at a 45 degree angle and may also be sealed or adhesively reconnected at the basin corners or other locations with a food grade liquid silicone that cures when exposed to air. The seal of gasket 1705 may be made of a flexible material, such as rubber, plastic, TPV, TPE, TPO and/or silicone and may create a hermetic seal between a transparent still cover material 840 and the basin sill 825. In one variation, a liquid silicone, for example, Dow Corning 40 or 999-A, may be applied in channel 1710 and/or on the outer circumference of upper portion 1730 to provide a better hermetic seal. As such, the seal or gasket 1705 may prevent water, condensate gases, and heat from escaping the distillation chamber via the area between the transparent still cover material 840 and the basin sill 825.

Figure 18:
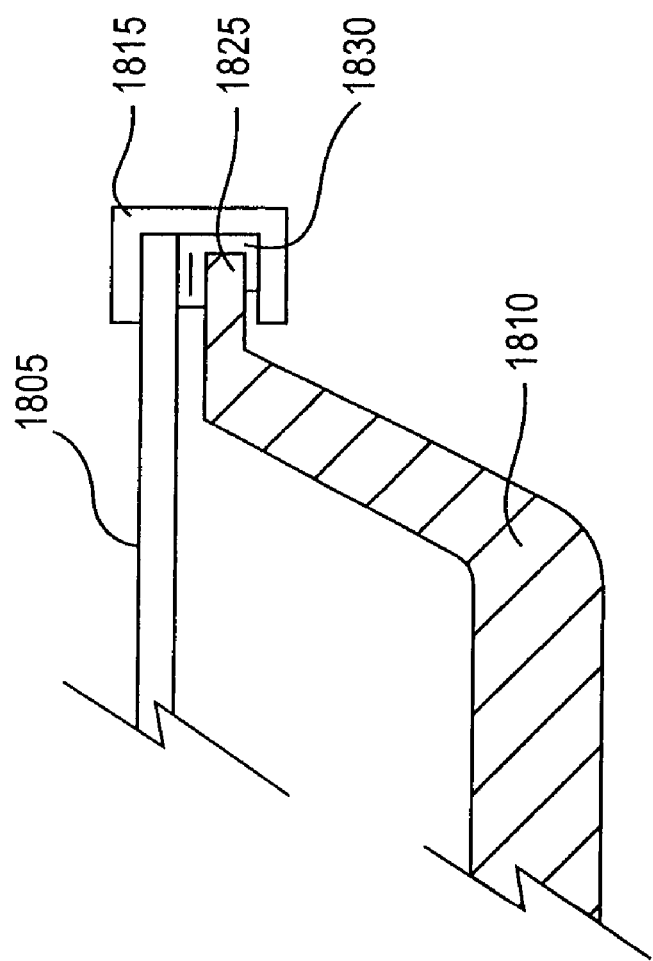
FIG. 18 shows a cross section view of a seal strip or gasket and a rubber and metal clamping seal sealing a transparent sheet to the lip of a solar distillation basin.

FIG. 18 shows a partial cross section of a solar distillation system including the seal or gasket 1705 (indicate as 1830). In this embodiment, the seal or gasket 1830 (1705) may be placed on the sill or lip 1825 of the basin 1810. A transparent sheet 1805, for example a sheet of tempered safety glass, is place over the top of the seal or gasket 1830. Next, a clamping member 1815 having, for example, a C or U shape is placed around a portion of the transparent sheet 1805, the seal or gasket 1830 and the sill or lip 1825 of the basin 1810. As can be seen, in this embodiment the clamping member 1815 places pressure on the top and bottom of the configuration to hold the transparent sheet 1805 in place on the basin 1810 and compress the seal or gasket to hold it in place about the sill or lip 1825 and form a seal with a portion of the transparent sheet 1805. The top portion of the seal or gasket may be squeezed tightly so as to compress the hollow center closed. In one variation, the clamping member may include spring tension and may be made from made of a metal core surrounded by plastic or rubber, e.g., a TrimLock strip, so as to assist in the sealing of the transparent sheet 1805 to the basin 1810. In a further variation, an adhesive or liquid sealing material such as silicone for example, Dow Corning 40 or 999-A, could be also applied to the areas of interface between the various components including the interface between the transparent layer 1805 and the seal or gasket 1830 and the interfaces between the basin lip 1825 and the seal or gasket 1830, so to help create an even more air tight seal. In any case, and particularly in this variation, the clamping member 1815 need not be covered with rubber. Further, as in the earlier embodiments, the transparent layer 1805 may be sealed to the basin lip 1825 with an adhesive such as a silicone and the seal or gasket 1830, without the use of a spring loaded trim strip.

Figure 19:
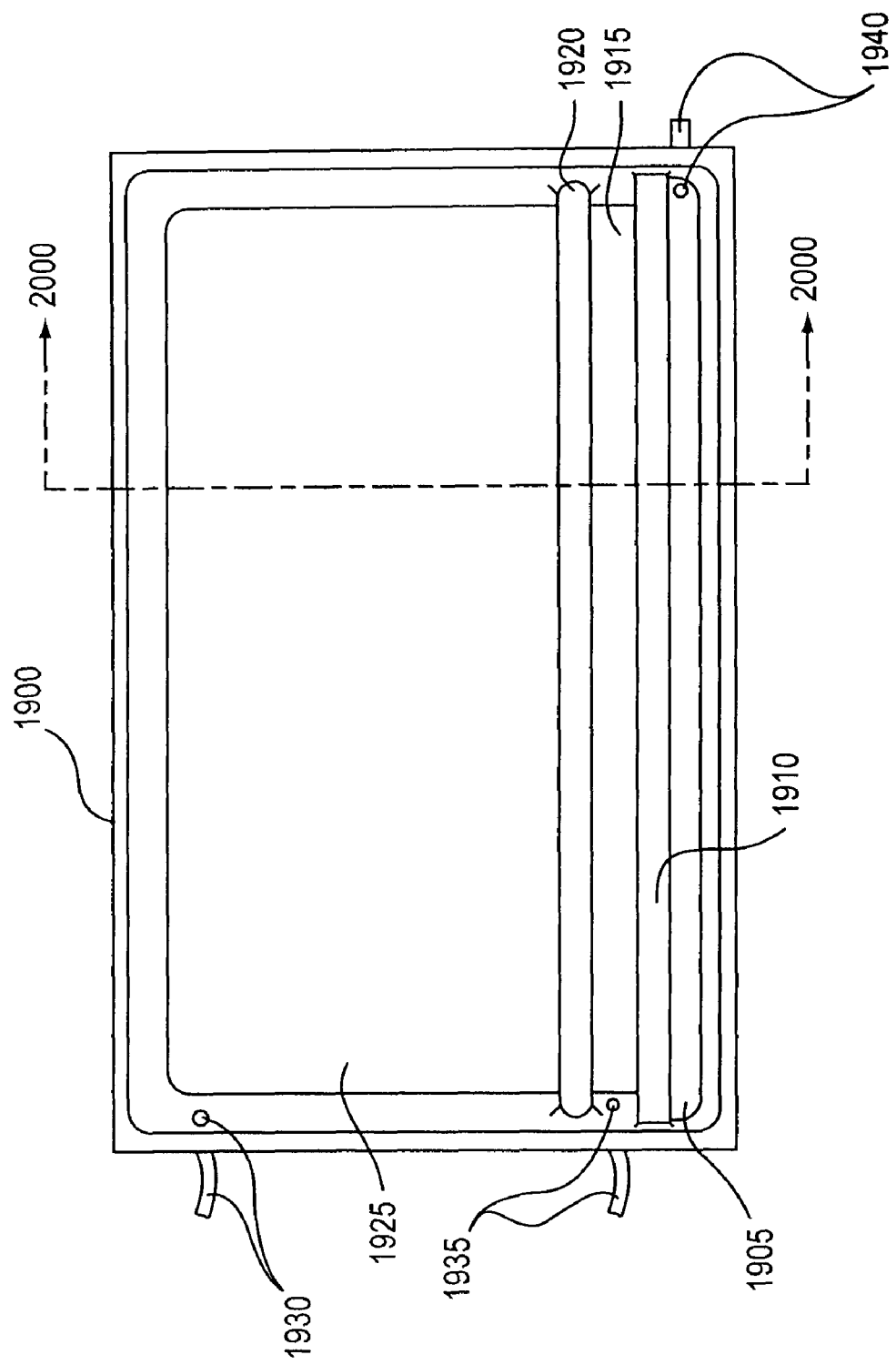
FIG. 19 shows a top view of a solar distillation basin including an overflow trough, according to one embodiment of the present invention.
Figure 20:
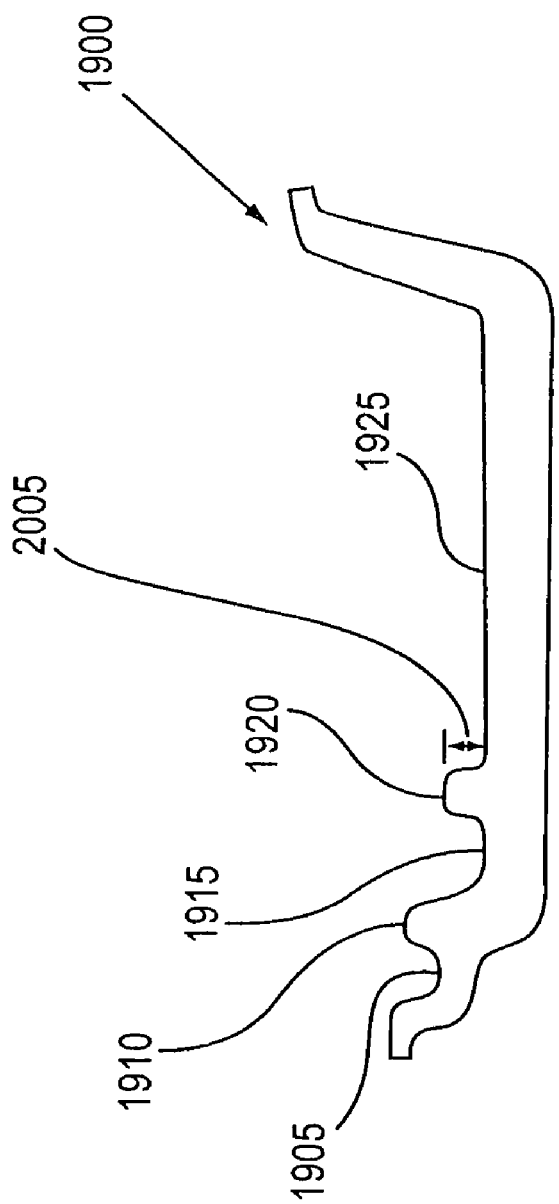
FIG. 20 shows a cross section view of the solar distillation basin illustrated in FIG. 19, according to one embodiment of the present invention.

FIGS. 19 and 20 illustrate an alternative basin configuration including a single pre-distillation liquid retention area, an overflow area or trough, and a distillate (distilled liquid) collection and output area or trough. As such, similar to the multi liquid retention area basin shown in FIGS. 13 and 14, the solar distillation system may have a basin 1900 that includes an overflow collection trough 1915 that is separated from the rest of the basin 1900 by at least a wall or dam member 1920. The wall or dam member 1920 may stretch across the entire length of the basin 1900 and attach to opposing sidewalls of the basin 1900. An overflow port or hose 1930 may be included in one wall of the basin 1900 and may be within the overflow area or trough 1910 so as to output pre-distillation liquid so that it does not flow into a distillate collection and output area or trough 1905 thereby contaminating the distilled liquid (e.g., distilled water from the still). However, the basin 1900 may have only a single pre-distillation liquid retention area 1925. Further, the distillate collection and output area or trough 1905 may be segregated from the rest of the basin 1900 by, for example, a wall or dam member 1910. An input port or hose 1930 locate in a wall of the basin 1900 within the pre-distillation liquid retention area 1925 may be include for inputting pre-distillation liquids and a distillate liquid output port or hose 1940 may be placed in a wall of the basin 1900 within the distillate collection and output area or trough 1905.

FIG. 20 is a cross section view of the basin 1900 taken across line 2000-2000 of the basin shown in FIG. 19, for one embodiment of the present invention. This illustrates one example of a preferred height 2005 from the basin floor and width for the wall or dam 1920 that helps separate the overflow trough from the rest of the basin floor area 1925. For example, the height 2005 of wall or dam 1920 may be in the range of ¼ inch to 1 inch. The height 2005 of the wall or dam 1920 may be selected to maintain a preferred pre-distillation liquid depth in area 1925 so as to achieve optimum distillate output. A typical height 2005 may be approximately ¾ of an inch. Although, the height of wall or dam member 1920 may be any-height, even higher then wall or dam member 1910, as long as it is not interfering with the flow of condensate on the transparent layer that is used to cap the basin 1900. The width of wall or dam member 1920 may be in a range of, for example, approximately ¼ inch to 1 inch. A typical width may be approximately ⅜ of an inch. The wall or dam may be made up of material of the basin casing, insulation, and/or membrane material, or a separate structure or material.

Although the overflow collection trough 1915 and wall or dam member 1920 are shown in FIGS. 19 and 20 as being locate adjacent to the distillate output area or trough 1905, one skilled in the art would appreciate that the overflow collection trough 1915 and wall or dam member 1920 may be located elsewhere in the basin and/or oriented differently as long as it assists in the overflow process. For example, overflow collection trough 1915 and wall or dam member 1920 may be located parallel to the distillate output area or trough 1905 but along the opposite wall of the basin 1900 as long as the input port or hose 1930 is located a sufficient distance from the opposite wall. In another variation, overflow collection trough 1915 and wall or dam member 1920 may be located perpendicular to the distillate output area or trough 1905. This arrangement may provide more pre-distillation floor space so as maximize distillate output. In a further variation, the distillation system may include a second overflow output port or hose locate in a wall of the basin 1900 within the pre-distillation liquid area and may be placed at a height above that of the first overflow output port or hose 1935 so as to act as a safety net in case the input flow rate of pre-distillation liquid entering the basin 1900 from input port or hose 1930 exceeds the flow rate of the first overflow output port or hose 1935.

It is noteworthy that the dimensions of the still basin are in a preferred embodiment set to be just within the maximum allowed total volume for standard shipping charges for international shipping by a common carrier such as United Parcel Service (UPS) to ensure cost effective shipping of the solar distillation still to various locations throughout the world. As such, a shipping container, for example a cardboard box, have the maximum allowable volume is used to cover the still for shipping. In a preferred embodiment, still shipping weight with glass and legs included is 52 pounds and overall dimensions must total under 130 inches for all dimensions (L×W×H—as per UPS requirements) and on average the distiller boxed shipping dimensions are approximately 50"×30"×8" (box is not perfectly square and is sloped).

Although particular embodiments of the present invention have been shown and described herein, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, in variations of the invention, material types used for the basin casing, membrane, legs, etc. may be used interchangeably (e.g., the membrane materials might be used for the basin casing and vice versa) and some embodiments might not include some components or parts (e.g., insulation layer or legs might be excluded).

All publications, patents, and patent applications cited herein are hereby incorporated by reference in their entirety for all purposes.

What is claimed is:

1. A solar powered distillation system basin, comprising:
a molded or vacuum formed basin casing made of a material selected from the group consisting of fiberglass, ABS, polycarbonate, polypropylene, and polybutylene;
a dark color material lining the basin casing of the solar powered distillation system for liquid distillate containment and absorbing sunlight to heat the solar distillation system; and
at least one layer of insulating material insulating at least a bottom surface of the basin casing.

2. The solar powered distillation system basin of claim 1, wherein the material lining the basin is an extruded, vacuum formed, molded or sprayed-on nonporous, impermeable membrane that is comprised of a material selected from the group consisting of Uniprene, Santoprene, Sarlink, silicone, and fiberglass reinforced polyester.

3. The solar powered distillation system basin of claim 1, wherein the basin casing has an approximately flat bottom surface, four side surfaces, at least a plurality of the four side surfaces tapering outward from a perpendicular direction from a normal plane surface of the approximately flat bottom surface, and an opening for admitting sunlight, and wherein covering the opening with a light admitting sheet will result in an approximate box shape solar powered distillation system having a bottom surface, four side surface walls, and a top surface light admitting sheet that admits and retains sunlight and heat, that together form an evaporation and condensation chamber for distilling liquid using sun light.

4. The solar powered distillation system basin of claim 1, further comprising: a plurality of leg mounting fittings formed integrally in a lower underside surface of the solar power distillation system.

5. The solar powered distillation system basin of claim 4, wherein the basin casing includes an overflow output.

6. The solar powered distillation system basin of claim 1, further comprising an overflow trough and a collection trough.

7. The solar powered distillation system basin of claim 1, wherein the solar power distillation system further comprising: a light admitting sheet placed over the basin casing and that allows sun light to enter the basin casing and heating to occur between the light admitting sheet and the interior of the basin casing; and
a seal or gasket between the basin casing and the and the light admitting sheet so as to seal the light admitting sheet to the basin casing.

8. The solar powered distillation system basin of claim 7, wherein a gasket with a cross-section shaped like the lower-case letter "e" seals the light admitting cover to the basin.

9. The solar powered distillation system basin of claim 8, wherein the light admitting cover is secured to the basin with a trim piece having spring tension that holds the light admitting cover against the basin.

10. The solar powered distillation system basin of claim 1, wherein the solar powered distillation system further includes a plurality of adjustable legs for support and leveling the basin.

11. The solar powered distillation system basin of claim 1, wherein the solar powered distillation system further includes a carbon filter attached to an inlet or outlet of the solar powered distillation system to remove impurities.

12. The solar powered distillation system basin of claim 1, wherein the system dimensions fall within the specifications for standard shipping charges for international shipping by a common carrier.

13. The a solar powered distillation system basin of claim 1, wherein the material lining the basin casing has an American National Standard Institute/National Sanitation Foundation (ANSI/NSF) Standard 61 rating approved for water contact.

14. A basin for a distillation system, comprising:
a basin casing having cubic inch size or volume of approximately 12000 square inches or less; and
a nonporous impermeable material lining the basin casing, wherein the system is constructed as a kit that all needed components and all the components are placed inside of a standard dimension box for shipping of approximately 50 inches by 30 inches by 8 inches, so that the system is easily and cost effectively shippable by a common carrier.

15. The basin casing for a distillation system of claim 14, wherein the volume of the system falls within the total maximum allowed volume for standard shipping charges for international shipping by a common carrier.

16. The basin casing for a distillation system of claim 14, wherein the weight of the system falls within the total maximum allowed weight for standard shipping charges for international shipping by a common carrier.

17. The basin casing for a distillation system of claim 14, wherein the dimensions of the system fall within the total maximum allowed dimensions for standard shipping charges for international shipping by a common carrier.

18. A solar powered distillation system, comprising:
a basin casing made of fiberglass;
an insulating layer abutting at least a portion of one surface of the basin casing so as to insulate that surface area of the basing casing;
a flexible seal placed around a perimeter of the basin casing for sealing a cover over the basin; and
a light admitting sheet, being the cover, and placed on top of the basin so as to interface with the seal and create an enclosed area between itself and the basin for holding and distilling a liquid placed in the basin and admitting light for heating and distilling the liquid.

19. The solar powered distillation system as claimed in claim 18, further comprising a nonporous impermeable layer formed along at least a portion of the inside surface of the basin casing and providing for liquid retention.

20. The solar powered distillation system as claimed in claim 19, further comprising a plurality of female or male fittings formed in the bottom of the solar power distillation system for attaching legs thereto.

* * * * *